United States Patent
Gyotoku

(10) Patent No.: US 10,218,907 B2
(45) Date of Patent: Feb. 26, 2019

(54) IMAGE PROCESSING APPARATUS AND CONTROL METHOD DETECTION AND CORRECTION OF ANGULAR MOVEMENT DUE TO SHAKING

(71) Applicant: CANON KABUSHIKI KAISHA, Tokyo (JP)

(72) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 15/213,588

(22) Filed: Jul. 19, 2016

(65) Prior Publication Data

US 2017/0026580 A1    Jan. 26, 2017

(30) Foreign Application Priority Data

Jul. 23, 2015   (JP) .................................. 2015-145450

(51) Int. Cl.
*H04N 5/232* (2006.01)
*H04N 5/14* (2006.01)

(52) U.S. Cl.
CPC ..... *H04N 5/23254* (2013.01); *H04N 5/23258* (2013.01); *H04N 5/23261* (2013.01); *H04N 5/23287* (2013.01); *H04N 5/144* (2013.01)

(58) Field of Classification Search
None
See application file for complete search history.

(56) References Cited

U.S. PATENT DOCUMENTS

| 9,912,869 | B2 * | 3/2018 | Miyahara | ........... H04N 5/23287 |
| 2008/0316330 | A1 * | 12/2008 | Egawa | .................. H04N 5/232 348/222.1 |
| 2010/0302385 | A1 * | 12/2010 | Kurihara | ............ H04N 5/23248 348/208.4 |
| 2011/0249149 | A1 * | 10/2011 | Ishida | ................ H04N 5/23238 348/239 |
| 2012/0268555 | A1 * | 10/2012 | Yamashita | ............. H04N 5/232 348/37 |
| 2017/0013198 | A1 * | 1/2017 | Wada | ....................... G03B 5/00 |

FOREIGN PATENT DOCUMENTS

JP        2014-060654 A        4/2014

* cited by examiner

*Primary Examiner* — Edemio Navas, Jr.
(74) *Attorney, Agent, or Firm* — Cowan, Liebowitz & Latman, P.C.

(57) ABSTRACT

An imaging device includes an angular velocity sensor for detecting an angular velocity of shake and a motion vector detection unit for detecting a motion vector of an object from a plurality of images successively imaged by an imaging element. A frame rate change unit changes a value of a frame rate related to an image used to detect the motion vector of the object according to the angular velocity of shake of the imaging device. The object angular velocity calculation unit calculates an angular velocity of an object with respect to the imaging device based on the angular velocity of shake of the imaging device and the motion vector of the object. A panning controller performs control to reduce a difference between the angular velocity of the object and the angular velocity of shake of the imaging device using drive control of a shift lens group.

13 Claims, 17 Drawing Sheets

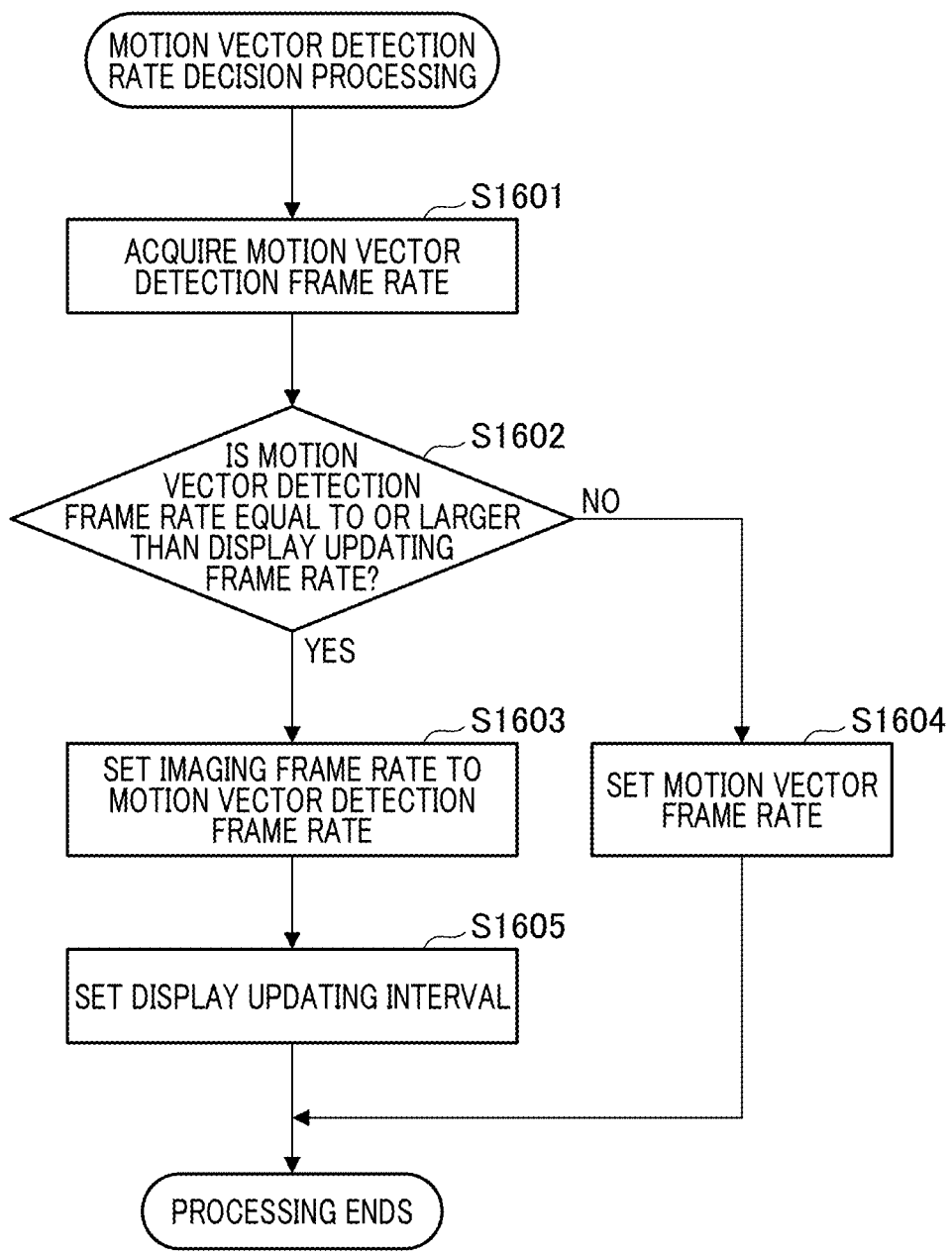

IMAGE PROCESSING APPARATUS AND CONTROL METHOD DETECTION AND CORRECTION OF ANGULAR MOVEMENT DUE TO SHAKING

BACKGROUND OF THE INVENTION

Field of the Invention

The present invention relates to a technique for improving performance of detecting a movement amount of an object based on a captured image.

Description of the Related Art

Panning is a method of photographing at a slower shutter speed than a normal shutter speed while following a moving object (object). Since it is possible to acquire an image with a moving background and a still object by panning, photos having a high sense of speed can be photographed. However, since long-time photographing is performed, it is difficult to match a velocity of an object and a shake velocity of a camera during an exposure period. This is one of photographing techniques requiring mastery of skills.

As a photography assist technique to suitably perform panning, there is a method of detecting a difference between a velocity of an object and a shake velocity of a camera and correcting an amount of blurring corresponding to the difference using an image shake correction function. An angular velocity sensor in a camera immediately before photography detects an angular velocity for the panning of the camera following the object, and an amount of movement of an image of a main object on an imaging surface is detected. It is possible to calculate an angular velocity of an object from the detected panning angular velocity and an amount of movement of an object image on an image surface. During the exposure, shake correction processing is executed according to an amount of difference between the calculated angular velocity of a main object and an angular velocity sensor output in the camera. It is possible to suppress blurring of the main object which is a panning target by a difference in panning velocity between the main object and the camera and correction on an amount of camera shake.

An important issue in the method is to more accurately determine an angular velocity of an object, that is, an angular velocity at which a photographer needs to pan a camera in accordance with the object to stop an image of the object at which the photographer aims. That is, when an error occurs in the angular velocity, the error may occur in correction by an image shake correction function. There is a possibility of errors appearing in an image as leftover blurring. In order to accurately determine an angular velocity of a main object, an amount of movement on an image surface needs to be detected and a motion vector needs to be detected by comparing an image of a current frame and an image of a next frame. In this case, a motion vector for each divided region (block) in an image may not be able to be accurately detected because it exceeds a search range set in advance when the motion vector is detected. In Japanese Patent Laid-Open No. 2014-60654, it is disclosed that an image is reduced in size and the number of pixels in the search region is decreased to substantially expand the search range.

However, the prior art disclosed in Japanese Patent Laid-Open No. 2014-60654 has a possibility of an amount of movement of an object being unable to be accurately detected if an image of an object becomes unclear due to a reduction in size of an image. When there are few chances to take photographs while panning, it is desirable to reduce the possibility of failure as much as possible.

SUMMARY OF THE INVENTION

The present invention provides improved detection performance of an amount of movement of an object in an optical detection of the object.

An image processing apparatus according to an embodiment of the present invention includes an acquisition unit configured to acquire an angular velocity of a shake of an imaging device and motion detection information of an object detected from a plurality of successively imaged image data; a decision unit configured to decide a value of a frame rate of an image used to detect the motion detection information; and a calculation unit configured to calculate an angular velocity of the object with respect to the imaging device from the angular velocity of the shake and the motion detection information of the object, wherein the decision unit decides the value of the frame rate corresponding to the angular velocity of the shake, and the acquisition unit acquires the motion detection information of the object detected from the plurality of the image data imaged at the frame rate decided by the decision unit.

An image processing apparatus of the present invention can improve performance of detecting an amount of movement of an object.

Further features of the present invention will become apparent from the following description of exemplary embodiments (with reference to the attached drawings).

BRIEF DESCRIPTION OF THE DRAWINGS

FIG. 16 is a flowchart illustrating decision processing of a frame rate of motion vector detection in a third embodiment of the present invention.

DESCRIPTION OF THE EMBODIMENTS

Hereinafter, each embodiment will be described with reference to accompanying drawings. A configuration and an operation of an imaging device to which an imaging processing apparatus is applied that are common to each embodiment will be described first and then each embodiment will be described. In each embodiment, a camera with a lens device mounted on an imaging device main body is described as an example, but the present invention is applicable to an information processing apparatus or the like having a camera or an imaging unit in which a lens and an imaging device main body are integrally configured.

Figure 1:
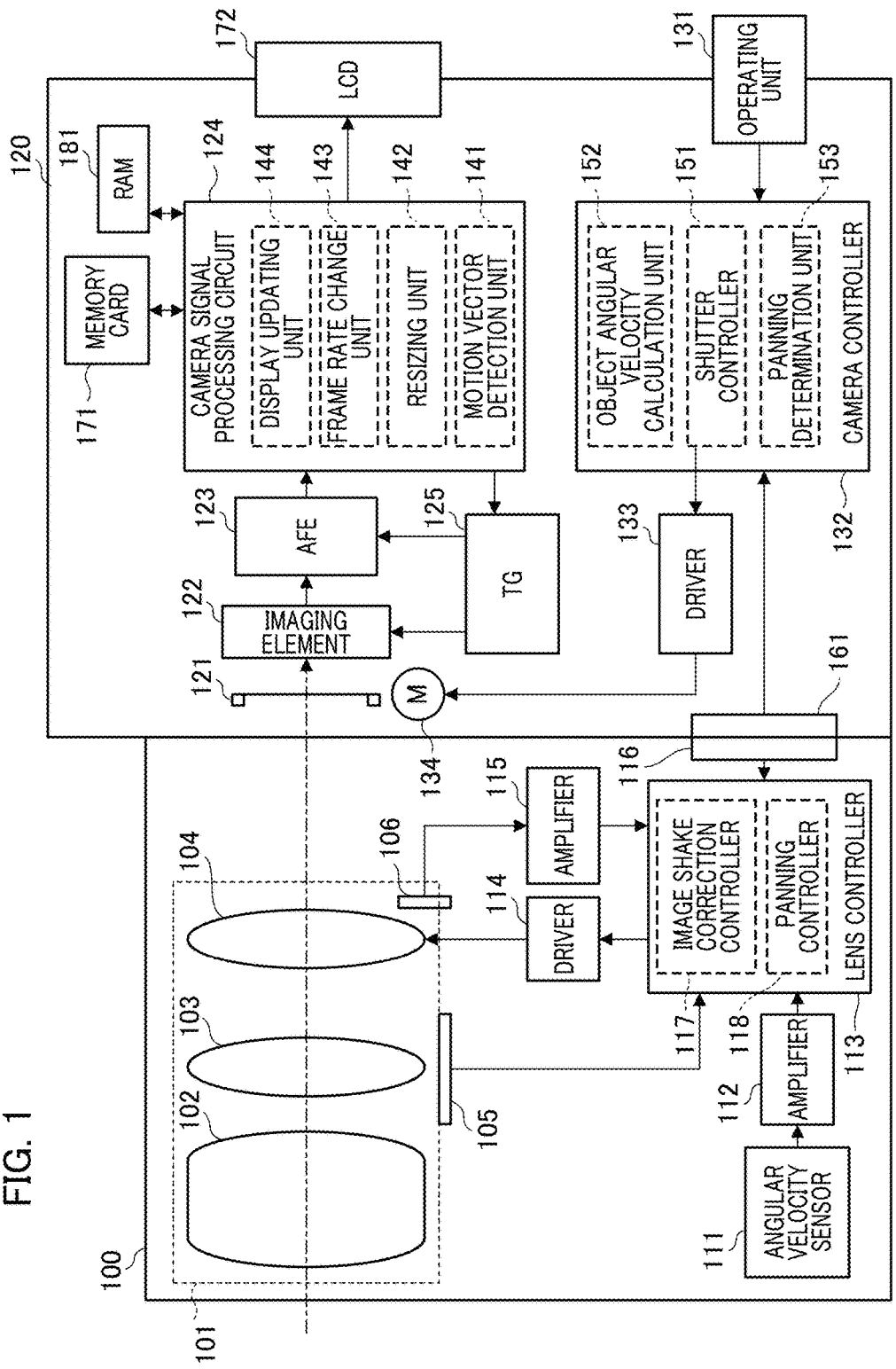
FIG. 1 is a block diagram illustrating an imaging device according to an embodiment of the present invention.

FIG. 1 is a block diagram illustrating a configuration example of an imaging device according to an embodiment of the present invention. The imaging device includes an interchangeable lens 100 and a camera main body 120 on which the interchangeable lens 100 is mounted. The interchangeable lens 100 includes a photographing lens unit 101. The photographing lens 101 includes a main imaging optical system 102, a zoom lens group 103 capable of varying a focal length, and a shift lens group 104 configuring an image shake correction optical system. The shift lens group 104 is a moveable optical member which optically corrects blurring of an image with respect to an optical axis caused by camera shake and the like by moving in a direction perpendicular to the optical axis. A zoom encoder 105 detects a position of the zoom lens group 103 and a position sensor 106 detects a position of the shift lens group 104. A position detection signal of each lens group is transmitted to a lens system control micro-computer (hereinafter referred to as a lens controller) 113.

An angular velocity sensor 111 detects shake of an imaging device and outputs an angular velocity detection signal to an amplifier 112. The amplifier 112 amplifies the angular velocity detection signal output from the angular velocity sensor 111 and outputs the signal to a lens controller 113. An amplifier 115 amplifies an output of a position sensor 106 and outputs the result to the lens controller 113. The lens controller 113 acquires a position detection signal of the shift lens group 104 from the amplifier 115 and performs drive control on the shift lens group 104 by outputting a control signal to the driver 114. In other words, the lens controller 113 includes an image shake correction controller 117 which performs image shake correction control, and controls the shift lens group 104 using the driver 114 driving the shift lens group 104. In addition, the lens controller 113 includes a panning controller 118 performing panning assist control. The panning assist is a function of assisting a user with panning by reducing a difference between a moving velocity (angular velocity) of an object and an angular velocity (panning velocity or tilting velocity) of shake of a camera by moving the shift lens group 104.

The lens controller 113 also performs focus lens control, aperture control, zoom lens control, and the like in addition to the panning assist control, but detailed description of these will be omitted for simplicity of illustration. In addition, the image shake correction controller 117 performs shake detection and image shake correction processing with respect to two orthogonal axes such as horizontal and vertical axes, but since this process is performed in a similar configuration except that the directions are different, only one axis will be described.

The interchangeable lens 100 and the camera main body 120 are coupled by mount contact portions 116 and 161. The lens controller 113 and a system control micro-computer (hereinafter referred to as a camera controller) 132 in the camera main body 120 is capable of performing serial communication through the mount contact portions 116 and 161 at a predetermined timing.

A shutter 121 of the camera main body 120 controls an exposure time. An imaging element 122 converts an image of an object imaged through a photographing lens unit 101 into an electric signal by photoelectric conversion and acquires an image signal. The imaging element 122 is an image sensor such as a complementary metal oxide semiconductor (CMOS) sensor. An analog signal processing circuit 123 is an analog front end (AFE) circuit for performing signal processing on an output of the imaging element 122. A camera signal processing circuit 124 acquires an output of the analog signal processing circuit 123 and performs signal processing to be described later.

A timing generator (hereinafter referred to as TG) 125 sets an operation timing of the imaging element 122 or the analog signal processing circuit 123 according to a signal from the camera signal processing circuit 124. The operating unit 131 is configured by a power switch, a release switch, a switch for switching a setting to a panning assist mode, and the like. The operating unit 131 outputs an operation signal in accordance with a user operation to the camera controller 132. The camera controller 132 is a central unit for controlling an entire system of a camera, and controls processing or operations of each unit in accordance with a user operation or the like. For example, the camera controller 132 outputs a control signal to a driver 133 and performs drive control on a motor 134 driving the shutter 121.

In addition, a memory card 171 is provided as a recording medium for recording data such as a captured image. A random access memory (RAM) 181 is a storage device for storing image data and the like. The memory card 171 and the RAM 181 are connected to the camera signal processing circuit 124. A display unit 172 includes, for example, a liquid crystal panel (LCD). The display unit 172 performs a monitor display of an image of an object that a user attempts to photograph using a camera, a display of a photographed image, and the like.

The camera signal processing circuit 124 includes a motion vector detection unit 141, a resizing unit 142, a frame rate change unit 143, and a display updating unit 144. In addition, the camera controller 132 includes a shutter controller 151, an object angular velocity calculation unit 152 which calculates an angular velocity of a main object, and a panning determination unit 153. Details of each unit will be described later.

Next, an overview of an operation of a first imaging device will be described. When a user performs a power-on operation (ON operation) on an imaging device using the operating unit 131, the camera controller 132 detects a state change of the imaging device. The camera controller 132 performs power supply and an initial setting to each circuit of the camera main body 120. In addition, power supply to the interchangeable lens 100 from the camera main body 120 is performed through the mount contact portions 116 and 161. The lens controller 113 performs an initial setting in the interchangeable lens 100. Then, communication between the lens controller 113 and the camera controller 132 starts at a predetermined timing. The camera controller 132 and the lens controller 113 transmit or receive information at a required timing. The information includes, for example, information on a state or a photograph setting of a camera transmitted from the camera controller 132 to the lens controller 113, information on a focal length of a lens transmitted from the lens controller 113 to the camera controller 132, information on an angular velocity, and the like.

In a first mode (normal mode in which setting of a panning assist mode is not performed), the angular velocity sensor 111 detects shake of a camera caused by camera shake and the like in the interchangeable lens 100. An output of the angular velocity sensor 111 is acquired by the image shake correction controller 117 of the lens controller 113 through the amplifier 112. The image shake correction controller 117 drives the shift lens group 104 and controls an image shake correction operation.

On the other hand, when a user sets a panning assist mode (a second mode) using the operating unit 131, the camera controller 132 is switched to a panning assist control. The camera controller 132 transmits switching information for the panning assist control to the lens controller 113 and the lens controller 113 shifts to the panning assist mode. When the panning assist mode is set, the camera controller 132 executes processing to acquire motion detection information of an object from video information imaged at a predetermined frame rate. As the motion detection information of an object, an amount of movement (motion vector) of an image of an object region is detected from data of an imaged image. That is, the motion vector detection unit 141 in the camera signal processing circuit 124 compares image data of a current frame with image data of a past frame, and detects and outputs a motion vector of the object. At the same time, the camera controller 132 receives an angular velocity detection signal detected by the angular velocity sensor 111 in the interchangeable lens 100 from the lens controller 113. Furthermore, the camera signal processing circuit 124 outputs once image data obtained by performing development processing and the like on the video information to the RAM 181. The display updating unit 144 reads image data on the RAM 181 and outputs the image data to the display unit 172 at an update interval corresponding to a synchronization signal. In order to sequentially display captured images on a screen of the display unit 172, display updating processing of a live view image is executed.

The motion vector detection unit 141 detects and outputs motion vectors of an object during panning. The motion vectors are two types of vectors. A first vector is a vector corresponding to the object (referred to as a main object) which a photographer intends to photograph. A second vector is a vector corresponding to a flowing background. The second vector is substantially equal to an amount of movement on an image surface which is converted from angular velocity data (detection information by angular velocity sensor 111) of a camera. In addition, the first vector has a smaller amount of movement than the second vector. Therefore, it is possible to identify the first and the second vectors and to specify a motion vector of a main object, that is, an amount of movement on an image surface of the main object. Description will be provided in detail with reference to FIG. 13A.

Figure 13A:
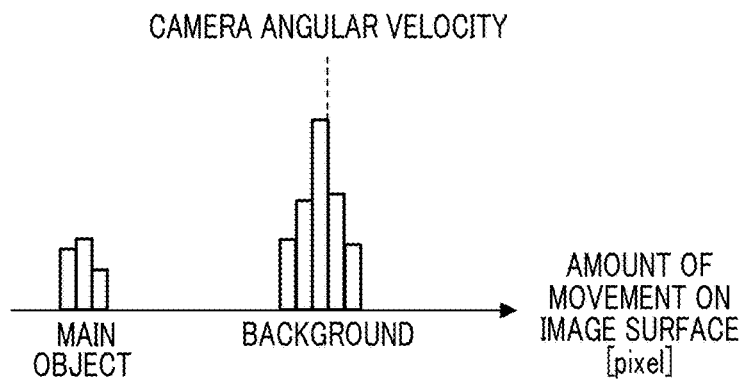
FIGS. 13A to 13C are views illustrating histograms when a motion vector detection result is converted into a movement distance on an image plane.

FIG. 13A illustrates a histogram having an amount of movement on an image surface of the object on a horizontal axis and a frequency on a vertical axis. FIG. 13A is divided into two regions including a background and a main object, and a peak (frequency peak) of frequency distribution appears in each region. An amount of movement on an image surface corresponding to a background region is collected in the vicinity of the camera angular velocity. Therefore, an amount of movement corresponding to the frequency peak in the background region is substantially equal to a magnitude of the second vector. An amount of movement corresponding to the frequency peak in the main object is substantially equal to a magnitude of the first vector. In this manner, it is possible to specify an amount of movement on an image surface of the main object.

Camera angular velocity data received from the lens controller 113 by the camera controller 132 corresponds to a panning velocity of a camera. For this reason, when a difference between the received camera angular velocity data and an angular velocity calculated from an amount of movement on the image surface of the main object and a current focal length of a photograph lens is calculated, the result is angular velocity data of the main object with respect to the camera. The camera controller 132 transmits the angular velocity data of the main object for the camera calculated by the object angular velocity calculation unit 152 to the lens controller 113.

Figure 2:
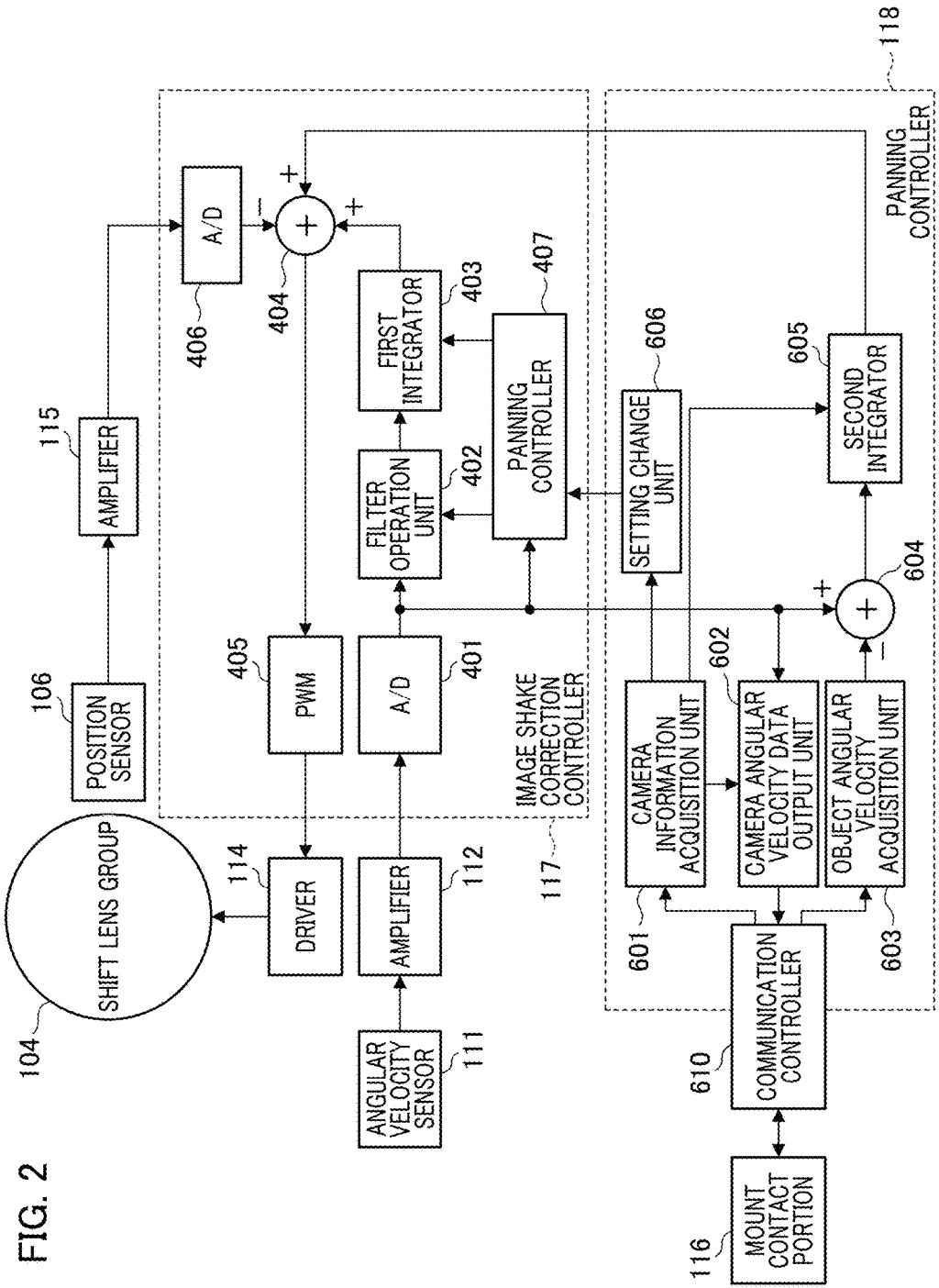
FIG. 2 is a block diagram illustrating a panning control according to the embodiment of the present invention.

The panning determination unit 153 of the camera controller 132 integrates camera angular velocity data received from the lens controller 113 and holds angle data in a storage unit. In addition, the panning determination unit 153 can reset the integrated data (angle data) held in the storage unit at a predetermined timing. Accordingly, when a user performs panning, an angle change (panning angle) of a camera that starts from a predetermined timing can be acquired. With reference to FIG. 2, a shift lens drive control in the interchangeable lens 100 in a panning assist mode will be described.

FIG. 2 is a block diagram of mainly the image shake correction controller 117 and the panning controller 118 according to an embodiment of the present invention. Portions corresponding to components of FIG. 1 in FIG. 2 are given reference numerals already used, and thereby description of these portions will be omitted. First, details of components (refer to reference numerals 401 to 407) of the image shake correction controller 117 will be described. An A (analog)/D (digital) converter 401 acquires a shake signal detected by the angular velocity sensor 111 from the amplifier 112 and converts the shake signal into a digital signal. Sampling of data output from the angular velocity sensor 111 is performed in a frequency band of about 1 to 10 kHz. An output of the A/D converter 401 is sent to a filter operation unit 402.

The filter operation unit 402 is configured by a high pass filter (HPF) and the like, and performs processing for panning measures by removing an offset component included in an output of the angular velocity sensor 111 and changing a cutoff frequency. A first integrator 403 acquires an output of the filter operation unit 402, integrates angular velocity data, and converts the data into angular displacement data to generate drive target data of the shift lens group 104. The first integrator 403 outputs the angular displacement data to an adder 404. The angular displacement data is input to the adder 404 as a positive input.

An A/D converter 406 acquires an output of the position sensor 106 from the amplifier 115 and converts the output into digital data. The A/D converter 406 outputs the digital data (position detection data) to the adder 404. The position detection data is input to the adder 404 as a negative input. The adder 404 adds respective outputs of the first integrator 403, the A/D converter 406, and the panning controller 118. Addition in this case includes addition of a negative value (subtraction). An addition result of the adder 404 is output to a pulse width modulation (PWM) output unit 405. For example, the adder 404 subtracts a value representing a position of a current shift lens group from a drive target value of the shift lens group 104, and calculates drive amount data of the shift lens group 104. The PWM output unit 405 outputs a PWM signal corresponding to the calculated drive amount data to the shift lens drive driver 114.

Figure 3:
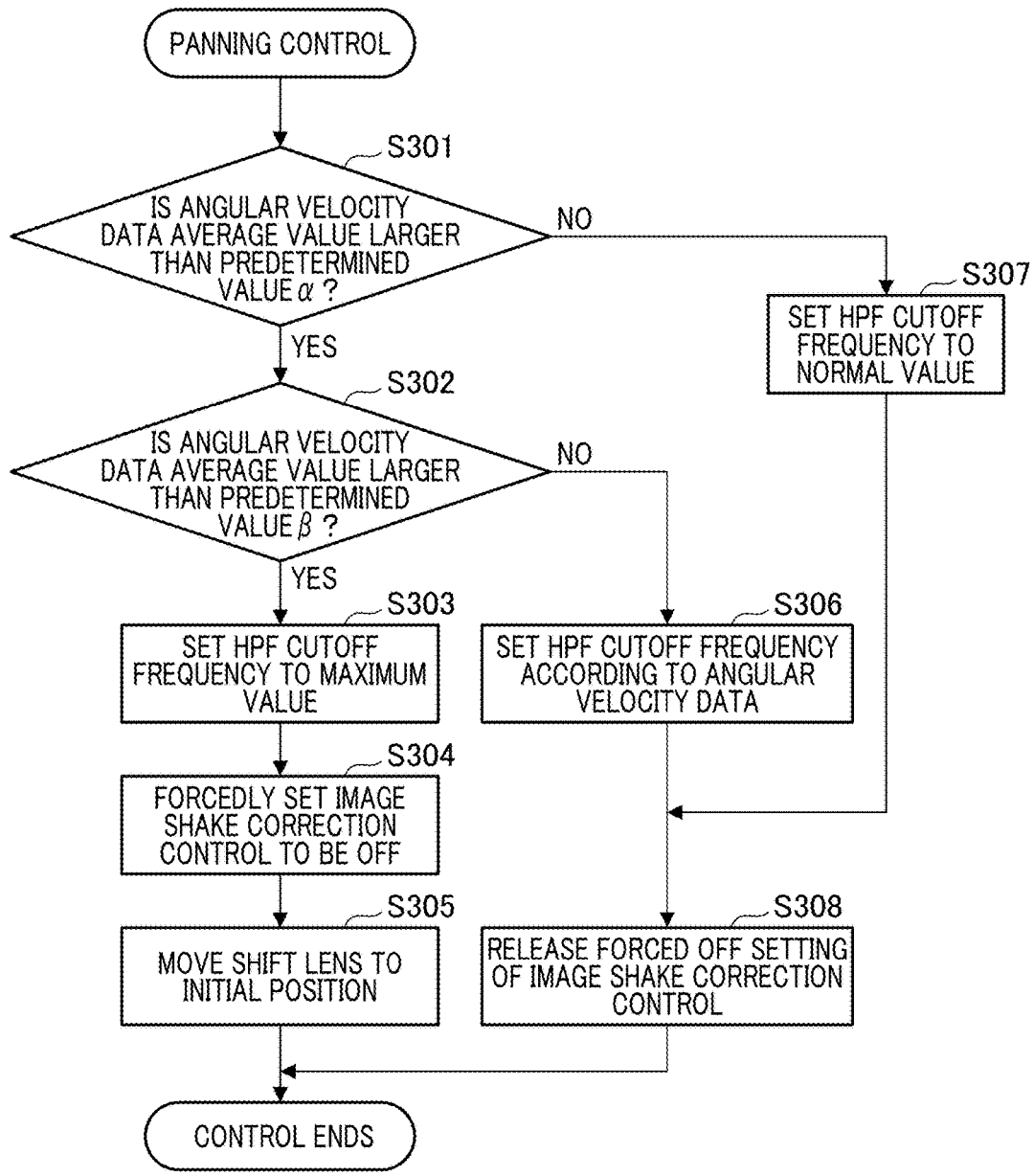
FIG. 3 is a flowchart of the panning control according to the embodiment of the present invention.

The panning controller 407 acquires an output of the A/D converter 401 and determines whether a panning operation is performed from a state of the angular velocity data. As a result of the determination, if the panning operation is determined to be performed, the panning controller 407 performs change control on a cutoff frequency of the filter operation unit 402 and adjusts an output of the first integrator 403. With reference to FIG. 3, panning control will be described in detail.

FIG. 3 is a flowchart illustrating an example of the panning control performed by the image shake correction controller 117 of the lens controller 113. The panning control is illustrated and described below, but the same processing is performed even in the case of tilting control.

The panning controller 407 in S301 of FIG. 3 compares an average value of angular velocity data acquired from the A/D converter 401 with a predetermined value. The average value of the angular velocity data is an average value of sampling a predetermined number of times, and the predetermined value (referred to as α) is a first threshold value for determination. It is determined whether the average value of the angular velocity data is greater than the first threshold value. If the average value of the angular velocity data is the predetermined value α or less, the panning controller 407 determines that the panning operation is not performed and the processing proceeds to S307. In addition, if the average value of the angular velocity data is greater than the predetermined value α, the procedure proceeds to S302.

The panning controller 407 in S302 compares an average value of angular velocity data with a predetermined value (referred to as β). The predetermined value β is a second threshold value for determination and it is determined whether the average value of the angular velocity data is greater than the second threshold value. As a result of the determination, if the average value of the angular velocity data is the predetermined value β or less, the panning controller 407 determines that a slow panning operation is performed and the processing proceeds to S306. In addition, if the average value of the angular velocity data is greater than the predetermined value β, the panning controller 407 determines that a fast panning operation is performed, and the procedure proceeds to S303.

The panning controller 407 in S303 sets a cutoff frequency of HPF in the filter operation unit 402 to a maximum value and an image shake correction control is forcedly set to be OFF in a next step S304. This setting is performed so that the shift lens group 104 is gradually stopped by increasing the cutoff frequency of HPF to eliminate discomfort from an image when the image shake correction control is turned off. In addition, at the time of the fast panning operation, an amount of movement caused by panning becomes very large with respect to a magnitude of the camera shake. Therefore, there is no sense of discomfort even if the image shake correction control is turned OFF and camera shake remains. If shake of a camera caused by a panning operation is intended to be corrected as a large shake without such a setting, a photographed image is stopped when panning starts, but there is a possibility of the image moving greatly. That is, since the image suddenly moves greatly at a moment when the shift lens group 104 reaches a correction end (corresponding to a limit position of a control range), there is concern of extremely unnatural movement appearing in the image. In the present embodiment, it is possible to present an image with less sense of discomfort to users due to the setting of S304.

Then, the panning controller 407 in S305 performs processing to gradually change an output of the first integrator 403 from current data to data at an initial position and causes the shift lens group 104 to move to the initial position. This is because a position of the shift lens group 104 is preferably an initial position of a drive range if an image shake correction operation is resumed the next time.

If the processing proceeds from S302 to S306, the panning controller 407 sets the cutoff frequency of HPF in the filter operation unit 402 according to the magnitude of the angular velocity data in S306. This is because it is not possible to ignore an effect of camera shake if a slow panning operation is performed. Processing of S306 is processing necessary for performing image shake correction while continuing to follow images during the panning enough not to be unnatural.

If the processing proceeds from S301 to S307, the panning controller 407 sets the cutoff frequency of HPF in the filter operation unit 402 to a normal value. The normal value is a value set in advance as a default value. After S306 or S307, the panning controller 407 releases a forced OFF setting of the image shake correction control in S308. The panning control is finished after S305 or S308.

Figure 4:
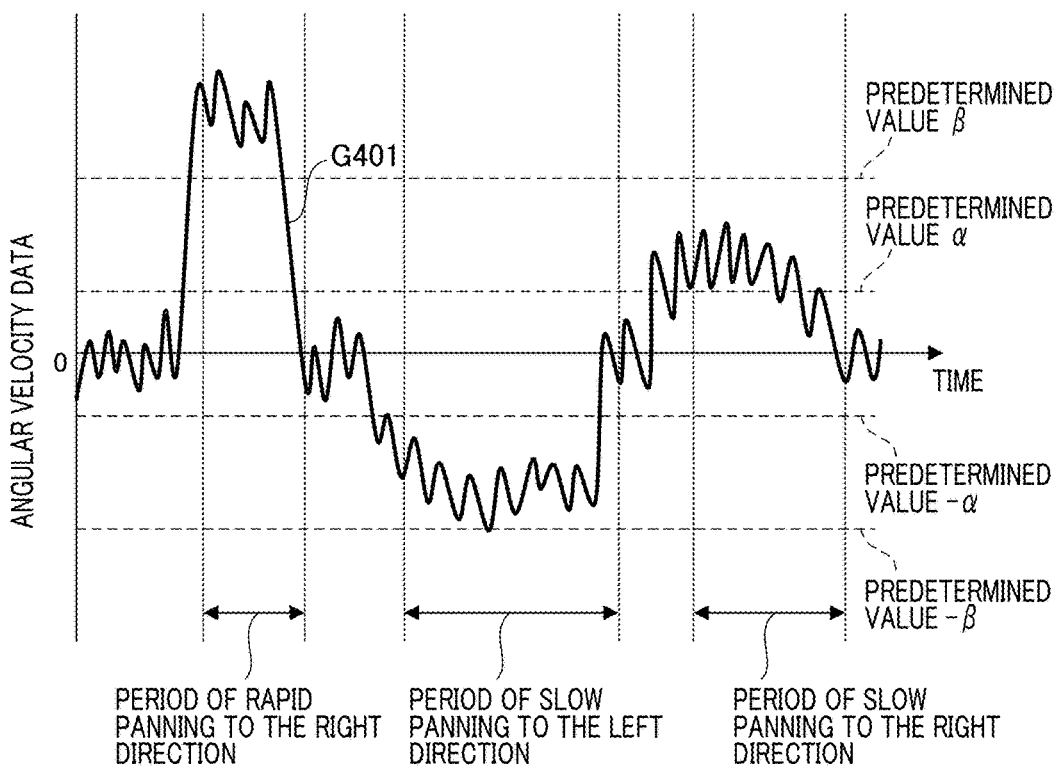
FIG. 4 is a diagram illustrating the panning determination.

Next, a relationship between the angular velocity data and the predetermined values α and β will be described with reference to FIG. 4. A horizontal axis of FIG. 4 is a time axis, and a vertical axis represents angular velocity data in a horizontal direction at the time of panning. Absolute values of the predetermined values α and β satisfy the relationship $|β|>|α|$. A graph line G401 is a plot of sampling results of the angular velocity data. In this example, an output of a positive direction is obtained as angular velocity data if a camera pans to the right. If the camera pans to the left, an output of a negative direction is obtained as angular velocity data. As seen from a time variation of the graph line G401, rapid panning to the right and slow panning to the left are detected.

In FIG. 4, the angular velocity data greatly deviates from an initial value (0 in this case) during the panning operation. If a drive target value of the shift lens group 104 is calculated as the angular velocity data is integrated, there is a possibility of the integrated output becoming a very large value due to a DC (direct current) offset component and becomes an uncontrollable state. This becomes particularly remarkable in the case of rapid panning. In this embodiment, if panning is detected, DC components are cut by performing processing to increase the cutoff frequency of HPF in the filter operation unit 402 to be relatively high. In the case of rapid panning, the integrated output is further set not to increase by increasing the cutoff frequency of HPF. If a panning velocity is high, since movement of images due to panning becomes very large with respect to camera shake, there is no particular sense of discomfort even if the image shake correction function is turned off with respect to a panning direction. By performing the above panning control, it is possible to monitor and display an image with no sense of discomfort during the panning.

Next, with reference to FIG. 2, components (refer to reference numerals 601 to 606) of the panning controller 118 will be described in detail. A camera information acquisition unit 601 acquires setting information, release information, and the like of the panning assist mode from a communication controller 610. A camera angular velocity data output unit 602 samples camera angular velocity data from the A/D converter 401 at a predetermined timing to transmit it to the camera controller 132.

A object angular velocity acquisition unit 603 acquires angular velocity data of a main object necessary for a panning assist from camera information obtained by communication. The adder 604 sets camera angular velocity data from the A/D converter 401 as a positive input and sets object angular velocity data of an object from the object angular velocity acquisition unit 603 as a negative input, and calculates a difference therebetween. A second integrator 605 acquires an output of the adder 604 and performs an integration operation only for a predetermined period of time. A setting change unit 606 changes settings according to the mode information acquired by the camera information acquisition unit 601. The communication controller 610 is provided in the lens controller 113 for two-way communication with the camera controller 132, and outputs received information to the camera information acquisition unit 601 and the object angular velocity acquisition unit 603.

If the panning assist mode is set by an operation of a switch provided in the camera main body, the received information of the communication controller 610 is read by the camera information acquisition unit 601 and the setting change unit 606 is notified thereof. The setting change unit 606 performs a setting change of the panning controller 407 according to the mode information of which it was notified. The setting change performed herein is a change to facilitate a shift to the rapid panning state. More specifically, the predetermined values α and β for the above-mentioned panning determination are changed.

Moreover, the object angular velocity acquisition unit 603 reads the angular velocity data of the main object transmitted from the camera controller 132 to the lens controller 113. The adder 604 calculates a difference between the camera angular velocity data detected by the angular velocity sensor 111 and the angular velocity data of the main object, and outputs the result to the second integrator 605. The second integrator 605 starts an integration operation according to a signal representing an exposure period acquired by the camera information acquisition unit 601, and outputs a value having a position of the shift lens group 104 at a predetermined position, for example, a center position of a control range, in the other periods. Here, if the shift lens group 104 is made to be disposed at a center position of the control range in a non-exposure period, the shift lens group 104 sharply moves from a current position to the center position when the exposure period ends. However, since a signal is read from the imaging element 122 immediately after the exposure period is ended, there is a period in which images are missing on the display unit 172. Therefore, movement of images caused by a sharp movement of the shift lens group 104 is not a problem.

An output of the second integrator 605 is sent to the adder 404, and the adder 404 performs addition of respective outputs of the first integrator 403 and the second integrator 605 which are positive inputs and subtraction of an output of the A/D converter 406 which is a negative input. Accordingly, an amount of drive of the shift lens group 104 is calculated.

If a photographer performs panning in a state in which the panning assist mode is set, the panning controller 407 immediately reacts in the interchangeable lens 100, panning control is performed on a rapid panning state, and an image shake correction operation is inhibited. That is, the shift lens group 104 corrects an amount corresponding to a difference between a camera angular velocity and an object angular velocity at a time of panning of a camera. Thus, a difference between a panning velocity and an object velocity of the camera during the exposure period which is a cause of a failure of the panning is offset by an operation of the shift lens group 104. As a result, the panning can be successfully performed.

Embodiments of an imaging device which allows an amount of movement of a main object to be detected even in a situation in which the main object is hardly specified in a relationship between a moving velocity of the main object and a panning velocity of an imaging device will be described below.

First Embodiment

Figure 5:
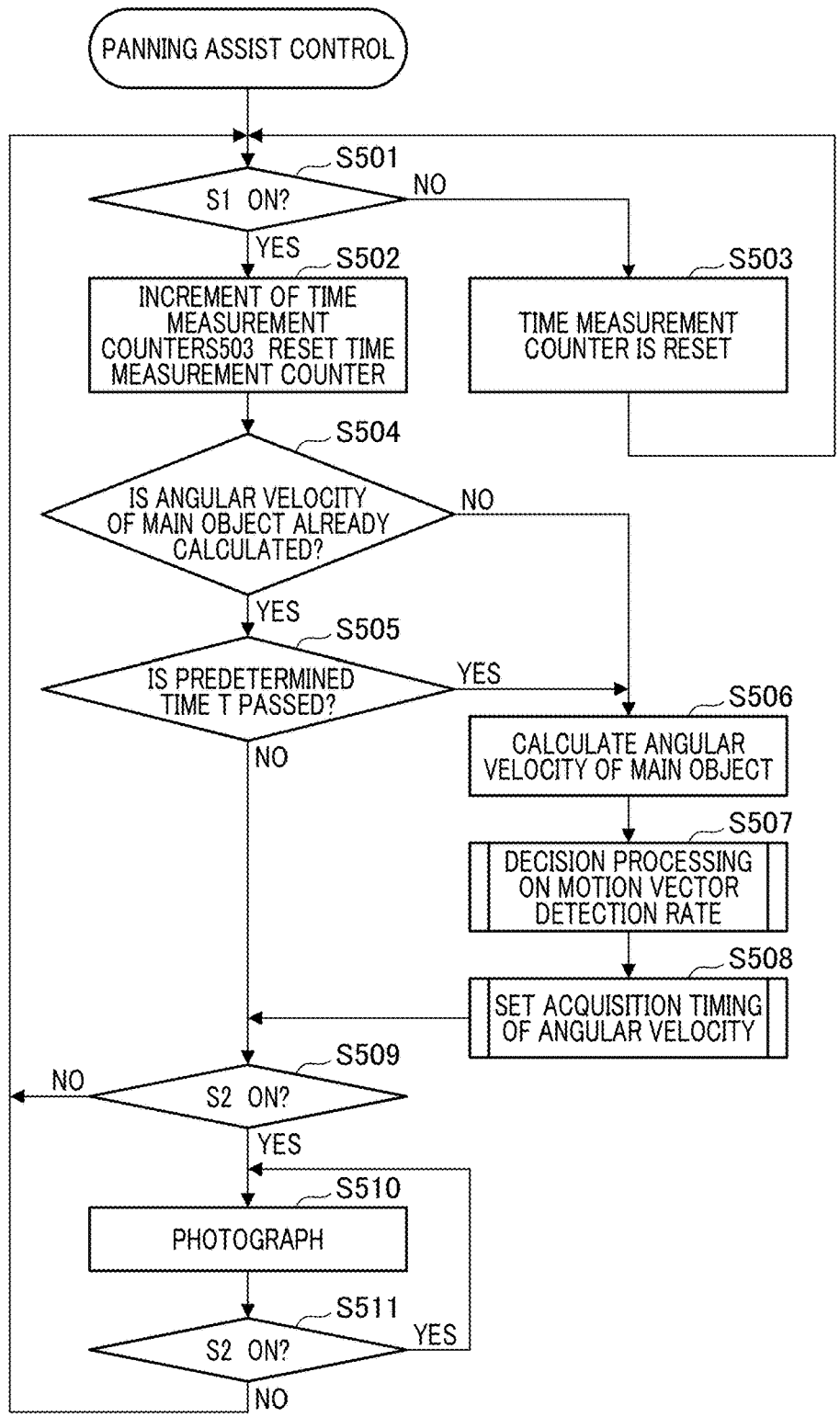
FIG. 5 is a flowchart of the panning control in a first embodiment of the present invention.

Hereinafter, a first embodiment of the present invention will be described with reference to FIG. 5. FIG. 5 is a flowchart which describes a photograph sequence in the panning assist mode in an imaging device according to the present embodiment. The following processing is realized by a central operation processing unit (CPU) of the camera controller 132 reading a program from a memory and executing the program.

The camera controller 132 in S501 of FIG. 5 determines whether a release switch is half-pressed. If the release switch is determined to be half-pressed, the procedure proceeds to S502, and if the release switch is determined not to be half-pressed, the processing proceeds to S503. The camera controller 132 in S502 performs an increment of a time measurement counter. In addition, the time measurement counter is reset in S503 and the procedure returns to S501.

Next to S503, the camera controller 132 in S504 determines whether the angular velocity of the main object is already calculated. If the angular velocity of the main object is determined to be calculated, the procedure proceeds to S505, and if the angular velocity of the main object is determined not to be calculated, the processing proceeds to S506. The camera controller 132 in S505 compares the time measurement counter with a predetermined time (referred to as T). That is, the camera controller 132 checks whether the predetermined time T has passed, and if the predetermined time T has passed, the procedure proceeds to S506. If the predetermined time T has not passed, the processing proceeds to S509.

The camera controller 132 in S506 calculates the angular velocity of the main object. Even if the angular velocity of the main object is already calculated in S504, the angular velocity of the main object is further calculated in S506. Processing to re-calculate an angle of the main object is a treatment in consideration of a case in which a velocity of the main object is changed as time elapses. The angular velocity of the main object calculated in S506 is transmitted to the lens controller 113 by the camera controller 132 with each calculation. In S507, processing to decide a frame rate for detecting a motion vector used in the calculation of a object angular velocity is executed. In the processing, the camera controller 132 controls TG125 through the frame rate change unit 143 and changes a frame rate when image data is acquired from the imaging element 122. Then, the panning controller 118 in S508 sets a sampling timing of an angular velocity based on a frame rate decided in S507 for the camera angular velocity data output unit 602. Then, the procedure proceeds to S509.

The camera controller 132 in S509 determines whether the release switch is fully pressed. If the release switch is determined to be fully pressed, the procedure proceeds to S510, and if the release switch is determined not to be fully pressed, the procedure returns to S501. The camera controller 132 in S510 performs control on a photographing operation in a state of current camera settings. Next, the camera controller 132 in S511 determines whether the release switch is fully pressed. If the release switch is determined to be fully pressed, the procedure returns to S510 and next photographing is started, and if the release switch in S511 is determined not to be fully pressed, the procedure returns to S501.

Figure 6A:
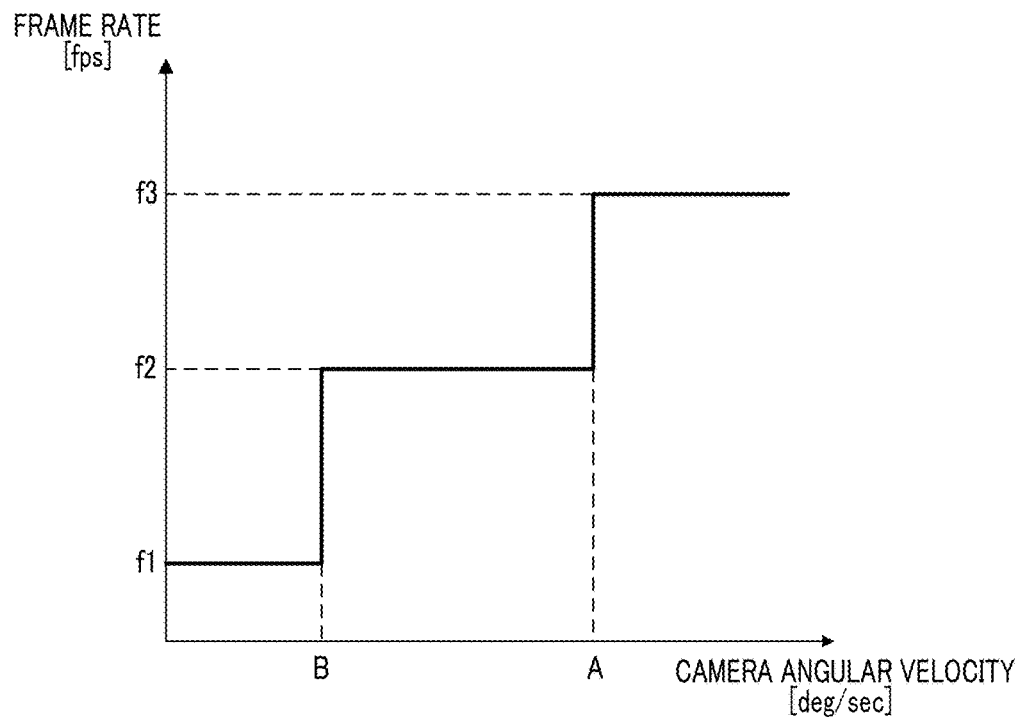
FIGS. 6A and 6B are graphs illustrating characteristics of a frame rate of the first embodiment.
Figure 6B:
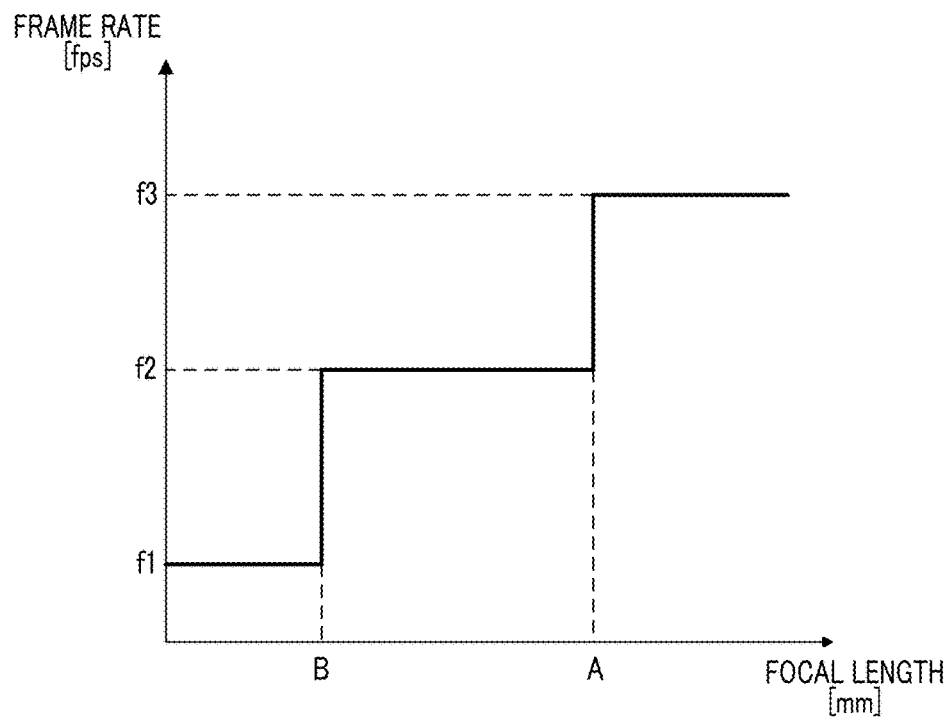
Figure 11A:
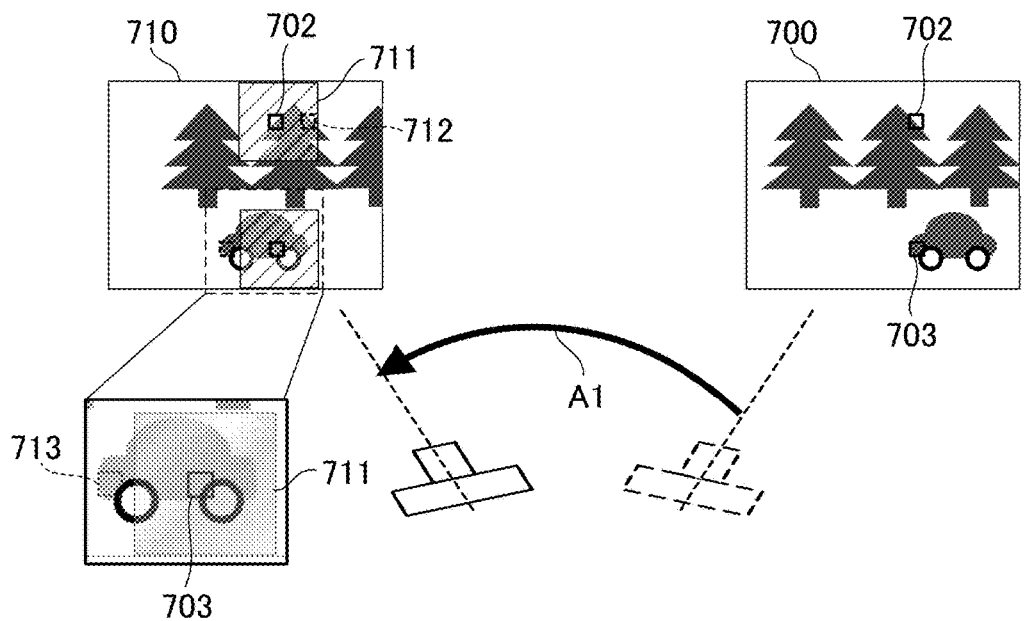
FIGS. 11A and 11B are explanatory views illustrating a detection region and a search range of a motion vector at a time of panning when a panning velocity is high.
Figure 11B:
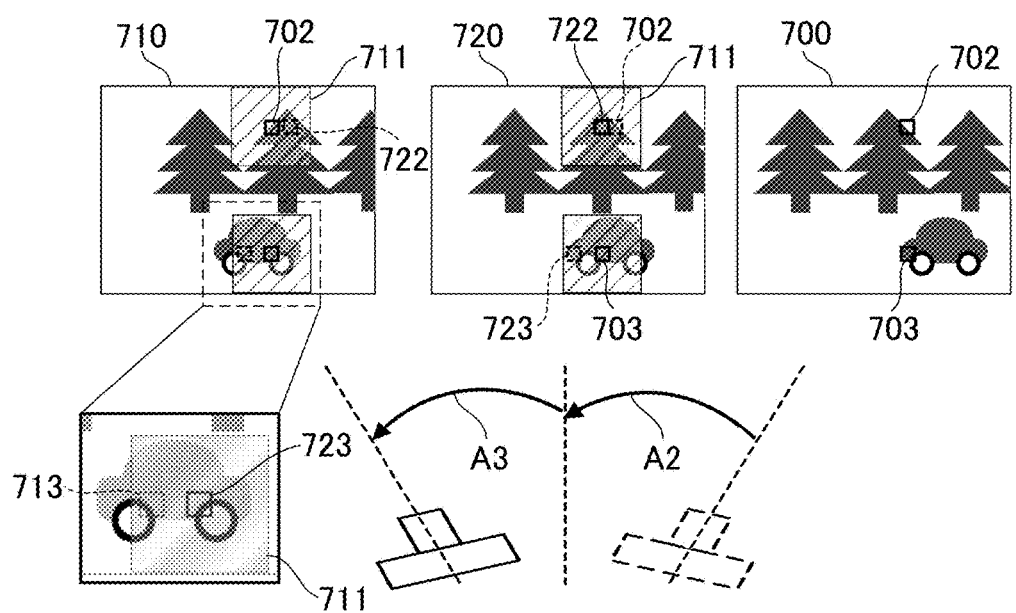

With reference to FIGS. 6A and 6B, decision processing of a frame rate for detecting a motion vector executed in S507 in FIG. 5 will be described. FIGS. 6A and 6B show an example in which a frame rate is controlled stepwise. FIG. 6A is a graph showing characteristics of deciding a frame rate for motion vector detection. A horizontal axis represents a camera angular velocity (unit: degrees/sec), and a vertical axis represents a frame rate (unit: fps). The camera angular velocities A and B represent threshold values and a ratio of frame rates f1, f2, and f3 is set to be "f1:f2:f3=1:2:4". As the camera angular velocity increases, that is, as a camera is more quickly panned, a value of the frame rate increases. If the camera angular velocity is high, that is, if a panning velocity is high, it is determined that a photographer intends to pan a fast-moving object, and a value of the frame rate is set to be large. As a result, the motion vector of the main object is detected at a high frequency. Here, an effect obtained by applying the present embodiment will be described with reference to FIGS. 11A and 11B. FIG. 11A is an explanatory view before an application, and FIG. 11B is an explanatory view after the application. Arrows denoted by A1, A2, and A3 in FIGS. 11A and 11B represent a panning direction.

FIG. 11A illustrates an image of a frame 700 and an image of a next frame 710 when a panning operation is performed in an arrow A1 direction. The frame 710, with respect to the frame 700, is assumed to be a frame after a time corresponding to one frame elapses. A rectangular range in the frame 710 represents a search range 711. The motion vector is calculated between the frame 700 and the frame 710. In this case, a target region of the motion vector detection is set to be a background image portion 702 and a main object image portion 703. On the frame 710 later than the frame 700, each image portion moves to the background image portion 712 and the main object image portion 713. If a movement distance on an image surface is large, the image portion 713 of the target region exceeds the search range 711, and there is a possibility of detection not being able to be properly performed.

On the other hand, in FIG. 11B, if the camera angular velocity is large, the frame rate is set to be a large value. As a result, a frame 720 is positioned between the frames 700 and 710. A target region of motion vector detection in the frame 720 is set to be a background image portion 722 and a main object image portion 723. That is, a frame next to the frame 700 is the frame 720, and the next frame is the frame 710. As represented by arrows A2 and A3, a period of panning of an arrow A1 shown in FIG. 11A is divided into a first period (a section of the frames 700 and 720) and a second period (a section of the frames 720 and 710). Accordingly, since the movement distance on an image surface is substantially short, the image portion 713 of the target region is fall in the search range 711 and it is possible to detect a movement vector of the main object during a period of the panning operation.

Conversely, if the camera angular velocity is small, that is, if a user performs a slow panning operation on a camera, the frame rate is set to be a small value. In this case, since a slow panning velocity means that a user intends to perform panning on a slow-moving object, there is hardly a difference between a main object and an amount of movement on an image surface of the background. Specific description will be provided with reference to FIGS. 12A and 12B.

Figure 12A:
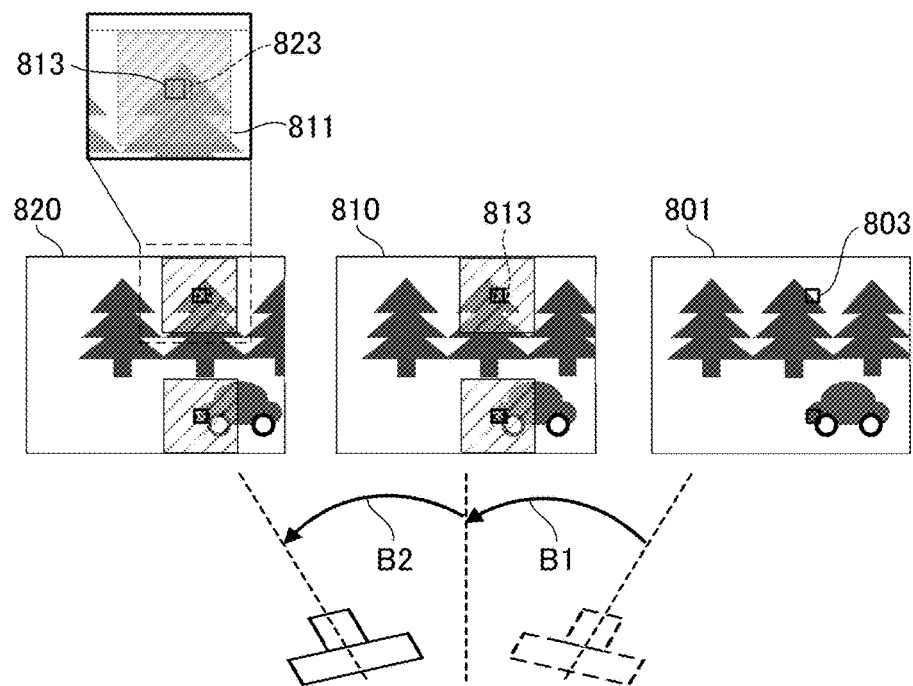
FIGS. 12A and 12B are explanatory views illustrating a detection region and a search range of the motion vector at the time of panning when the panning velocity is low.
Figure 12B:
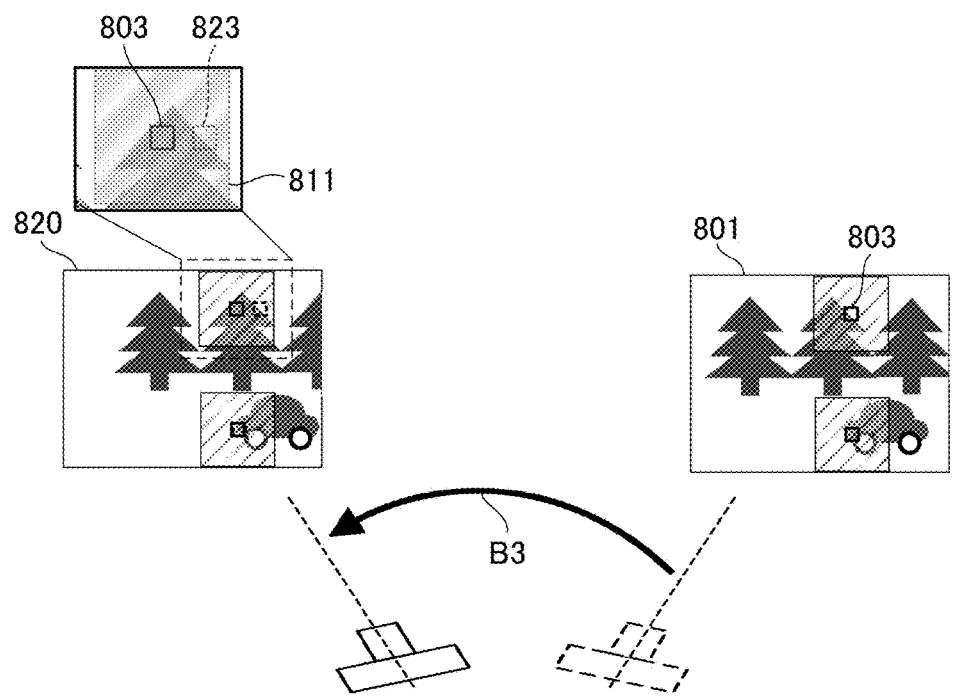
Figure 13B:
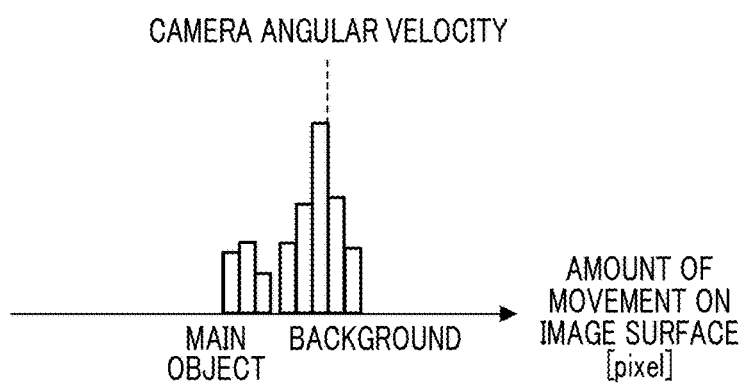

In FIG. 12A, a panning period represented by an arrow B1 corresponds to a section of a frame 801 and a frame 810, and a panning period represented by an arrow B2 corresponds to a section of a frame 810 and a frame 820. A motion vector in each period is detected. Target regions of motion vector detection in each of the frames 801, 810, and 820 are represented, respectively, in background image portions 803, 813, and 823. FIG. 13B is a diagram showing a histogram in which a result of the motion vector detection is converted into an amount of movement on an image surface. As described above, a motion vector of the main object is smaller than a motion vector of the background at the time of panning. However, the motion vector of the background is also small at the time of slow panning, and an amount of movement on an image surface of the background and the main object is collected in the vicinity of the camera angular velocity. Since it is difficult to distinguish the background from the main object, it is difficult to specify the main object.

Therefore, if the camera angular velocity is small as shown in FIG. 6A, the frame rate is set to a small value. By widening a detection interval of the motion vector, a panning period represented by an arrow B3 in FIG. 12B corresponds to a section of the frames 801 and 820. Since an image portion of the target region of the motion vector detection becomes the image portions 803 and 823 of each frame, a motion vector of the background is large. By placing a difference in an amount of movement between objects, it is possible to specify a motion vector of the main object. In FIG. 6A, characteristics of a case in which the camera angular velocities A and B are set as threshold values and the frame rate is changed stepwise are illustrated, but this is an example. The characteristics may include any characteristic as long as the frame rate becomes higher as the camera angular velocity becomes larger by continuously changing the frame rate according to the camera angular velocity.

In addition, as illustrated in FIG. 11A, as a situation in which an amount of movement between frames is large and an image portion of the target region is likely to deviate from a search range, there is a case in which a focal length of an imaging optical system is long. In this case, a movement distance on the image surface becomes large to the extent that a object appears large on the image surface even if the camera angular velocity is small. As a result, the image portion of the target region is likely to deviate from the search range. Therefore, a value of the frame rate is changed according to the focal length as shown in FIG. 6B. A horizontal axis of FIG. 6B represents the focal length (unit: mm) and a vertical axis represents the frame rate (unit: fps). A, B, and f1 to f3 are the same as in FIG. 6A. FIG. 6B shows characteristics of the case in which the camera angular velocities A and B are set as threshold values and the frame rate is changed stepwise as an example. The characteristics may include any characteristics in which the frame rate becomes higher as the focal length becomes larger.

Figure 7A:
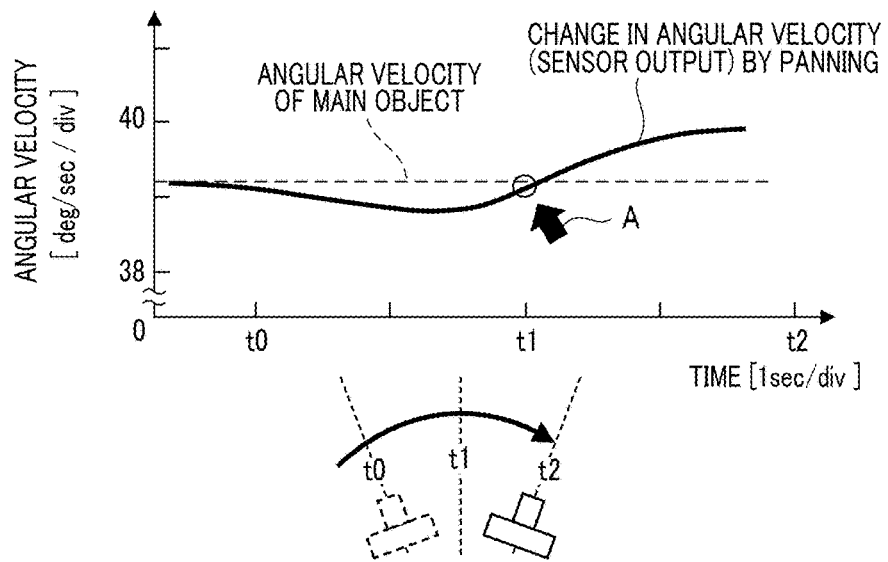
FIGS. 7A and 7B are diagrams illustrating a relationship between a calculation timing of a motion vector and an output of an angular velocity sensor.
Figure 7B:
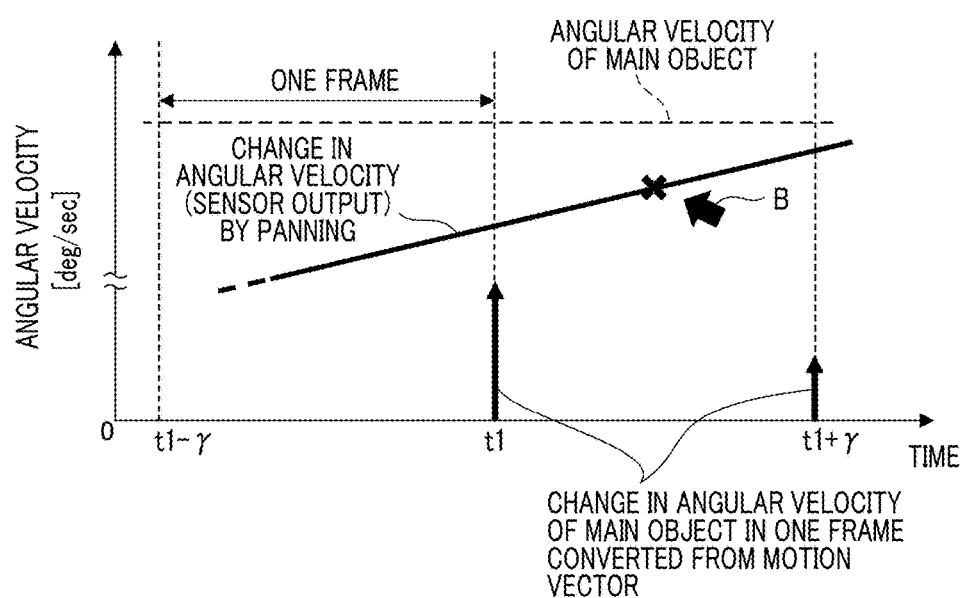

Next, with reference to FIGS. 7A and 7B, a method of acquiring appropriate angular velocity data for a frame rate of motion vector detection will be described. FIGS. 7A and 7B are diagrams which show changes in a camera angular velocity during panning of a camera (changes in an angular velocity sensor output) with respect to changes in the angular velocity of the main object during the panning, and a detected motion vector. A horizontal axis in FIGS. 7A and 7B is a time axis, and a vertical axis represents a magnitude of the angular velocity in a case in which panning is performed in a positive direction.

FIG. 7A illustrates a situation in which a user performs a panning operation on a camera following a object for about four seconds from time 0 to t0, t1, and t2. An angular velocity of a main object is represented by dashed lines, and changes in the camera angular velocity caused by the panning are represented by solid lines. A difference between a graph in the solid lines and a graph in the dashed lines in FIG. 7A corresponds to a portion in which a panning velocity of the camera deviates from the angular velocity of the main object. If photographing is performed in such a portion, an image with blurring generated in the main object will be photographed.

FIG. 7B is an enlarged view of a portion in a circular frame represented by arrow A in FIG. 7A, and a vertical axis represents an angular velocity. In addition, a time axis which is a horizontal axis represents times t1−γ, t1, and t1+γ. γ represents time of one frame, and represents a time corresponding to each frame around t1. Furthermore, changes in the angular velocity (differences in the angular velocity) of the main object converted from the motion vector of the main object detected in the one frame are represented by an arrow at time t1 and t1+γ in FIG. 7B.

Since an output of the angular velocity sensor 111 is sampled at about 4 kHz by the A/D converter 401, changes are performed smoothly even in one frame. On the other hand, since motion vector information is detected basically one time for a period of one frame, the motion vector information is discrete data with respect to information of the angular velocity sensor 111. Therefore, the angular velocity data is changed even in a period in which the motion vector is detected. Some errors are generated in a calculation result of the angular velocity of the main object depending on a timing of the sampling of the angular velocity data. In other words, if a timing to acquire the angular velocity data is an optimum timing, accuracy in the angular velocity detection of the main object will be improved. Here, attention is paid to changes in the angular velocity caused by the panning of FIG. 7B. A movement of the panning is basically in one direction and a frequency of changes in the camera angular velocity data is very low. Therefore, when changes in the angular velocity data are viewed in a frame time unit, the changes can be regarded as "substantially linear." In other words, if the angular velocity data can be acquired at a timing corresponding to a middle of an accumulation period and a next accumulation period, the data most closely matches the motion vector detection timing. For example, in FIG. 7B, camera velocity data most suitable for an angular velocity detection timing of the main object at the time t1+γ is data acquired at a time between the time t1 and the time t1+γ. That is, this is data acquired at a timing of the time t1+γ/2 corresponding to a time marked with x as represented by arrow B. More accurately, a time corresponding to just a middle of a period from a time corresponding to a middle of an accumulation period of an nth frame to a time corresponding to a middle of an accumulation period of the (n+1)$^{th}$ frame is an optimum detection time. In the present embodiment, a CPU is notified of a time at which the angular velocity data is required using a timer interrupt from a time when a synchronization signal is generated, and thereby it is possible to acquire the required data at an optimum timing.

Figure 8:
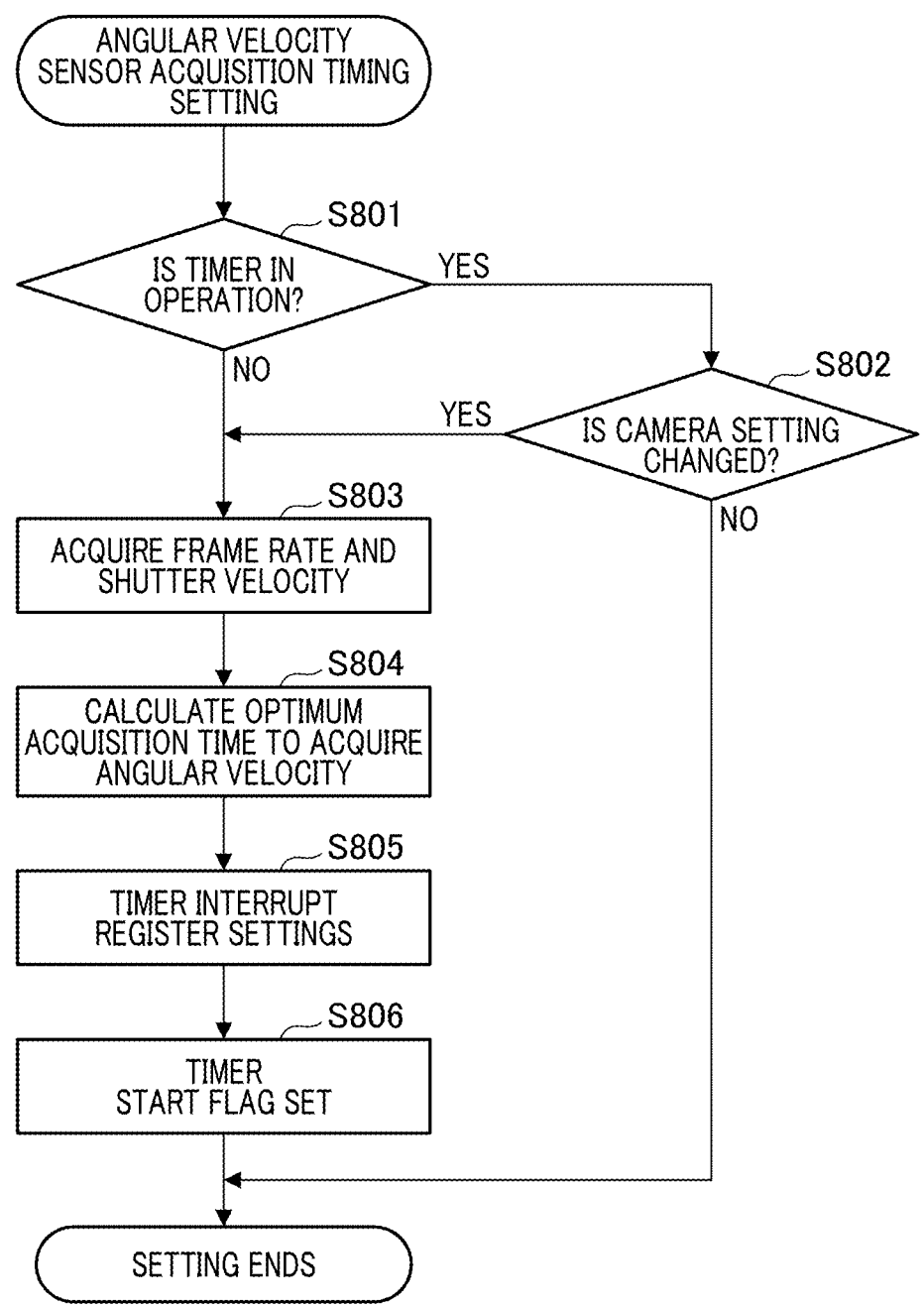
FIG. 8 is a flowchart illustrating setting processing of an acquisition timing of the output of the angular velocity sensor.

Next, with reference to FIGS. 8 and 9, control for acquiring appropriate angular velocity data for a frame rate of a motion vector detection will be described. FIG. 8 is a flowchart showing acquisition timing setting processing of the angular velocity data in S508 of FIG. 5 in detail, and the processing is performed in the camera angular velocity data output unit 602. In S801 of FIG. 8, a state of a start flag of a timer is determined based on whether a timer for acquiring angular velocity data is in a counting operation. If the timer is not in the counting operation, the procedure proceeds to S803, and if the timer is in the counting operation, the procedure proceeds to S802.

The camera angular velocity data output unit 602 acquires information on a current frame rate and a shutter velocity from the camera information acquisition unit 601 in S803. Based on the information, a time (a time corresponding to a center position of an accumulation period) from a synchronization signal to an acquisition timing of angular velocity data is calculated in S804. In S805, register settings of a timer interrupt are performed so that data is acquired at the timing set in S804. In S806, a start flag of a timer is set. The timer starts a counting operation based on settings of the start flag, and the timer interrupt is generated after a set time elapses. A start of the counting operation of the timer is executed in the middle of interruption processing.

If the timer is in the counting operation in S801, the processing proceeds to S802 and it is determined whether there is a change in settings of the camera. Here, as a result of S507 in FIG. 5, it is checked whether the frame rate is changed and the like. If there is a change in the settings of the camera, that is, if a change in the frame rate and in calculation of the acquisition time of the angular velocity data is generated, the processing proceeds to S803. Moreover, if camera settings are not changed in S802, a setting for acquiring the angular velocity data is made at a required timing, and thereby the processing ends.

Figure 9:
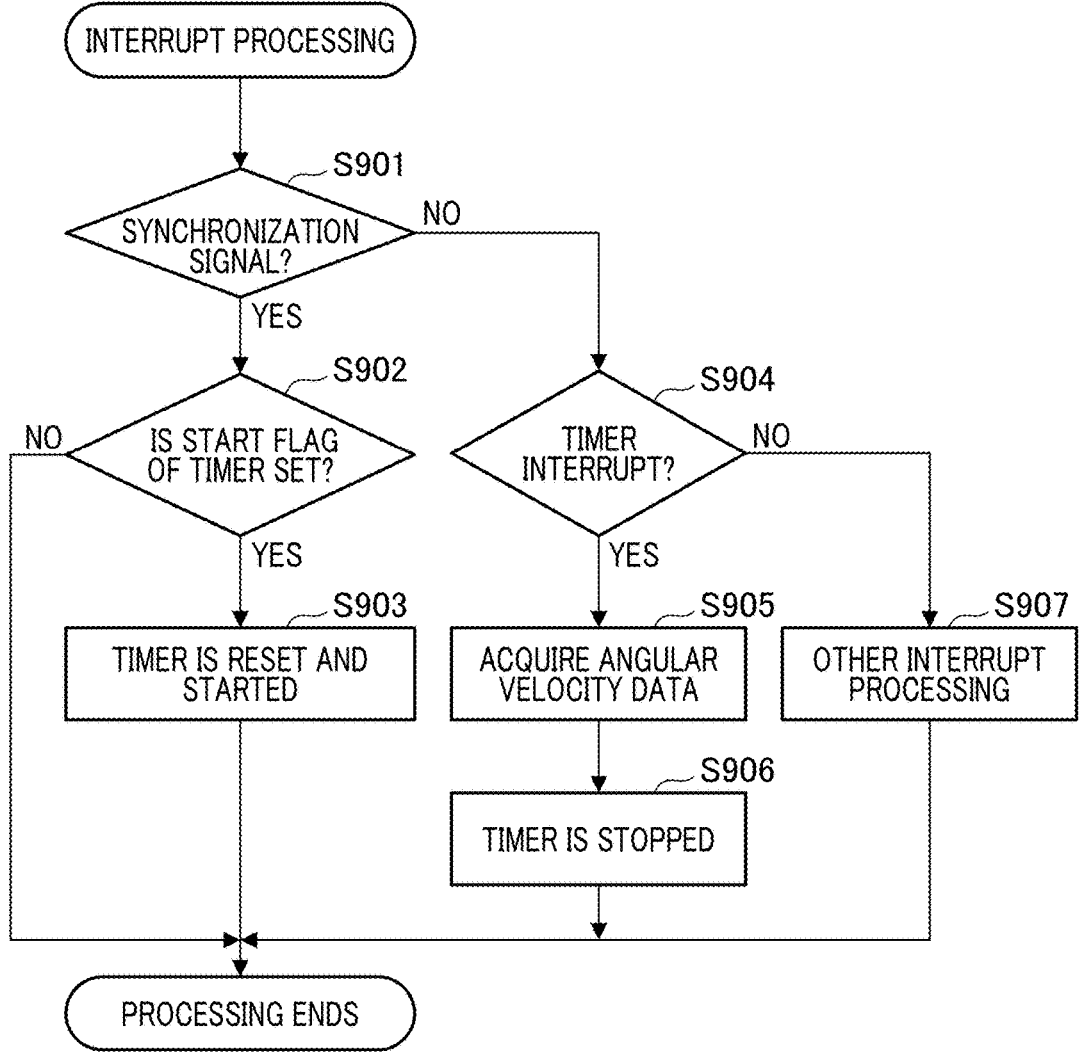
FIG. 9 is a flowchart of interruption processing.

FIG. 9 is a flowchart which shows interruption processing executed in the lens controller 113. There are various interrupt factors in the lens controller 113; however, FIG. 9 shows only processing necessary for a timing decision of sampling of the angular velocity sensor output. When interruption processing is started in FIG. 9, it is determined whether an interrupt by a synchronization signal is generated in S901. In the case of an interrupt caused by the synchronization signal, the processing proceeds to S902, and in the case of an interrupt caused by a non-synchronization signal, the processing proceeds to S904.

In S902, it is determined whether the start flag of the timer is set. The start flag of the timer is set in the panning assist mode. If the start flag is not set, the processing ends without any change. In addition, if the start flag is set, the processing proceeds to S903, and the timer is reset and started based on the value set in S805 of FIG. 8. In S904, it is determined whether a timer interrupt is generated. If the timer interrupt is generated, this shows that this time point is an optimum timing to acquire the angular velocity data, and thereby the processing proceeds to S905. If the timer interrupt is not generated, the processing proceeds to S907.

Processing to acquire the angular velocity data is performed in S905, and the timer is stopped in a next step S906. Moreover, if the processing proceeds from S904 to S907, since it is not a timer interrupt but an interrupt caused by other factors, interrupt processing by each factor is performed in S907. After the processing of S906 or S907, the interrupt processing ends. A camera shake component is also included in the angular velocity data acquired in S905, but a change in the angular velocity sensor output caused by the camera shake is negligibly small with respect to the angular velocity sensor output generated by the panning in the panning period.

Figure 10:
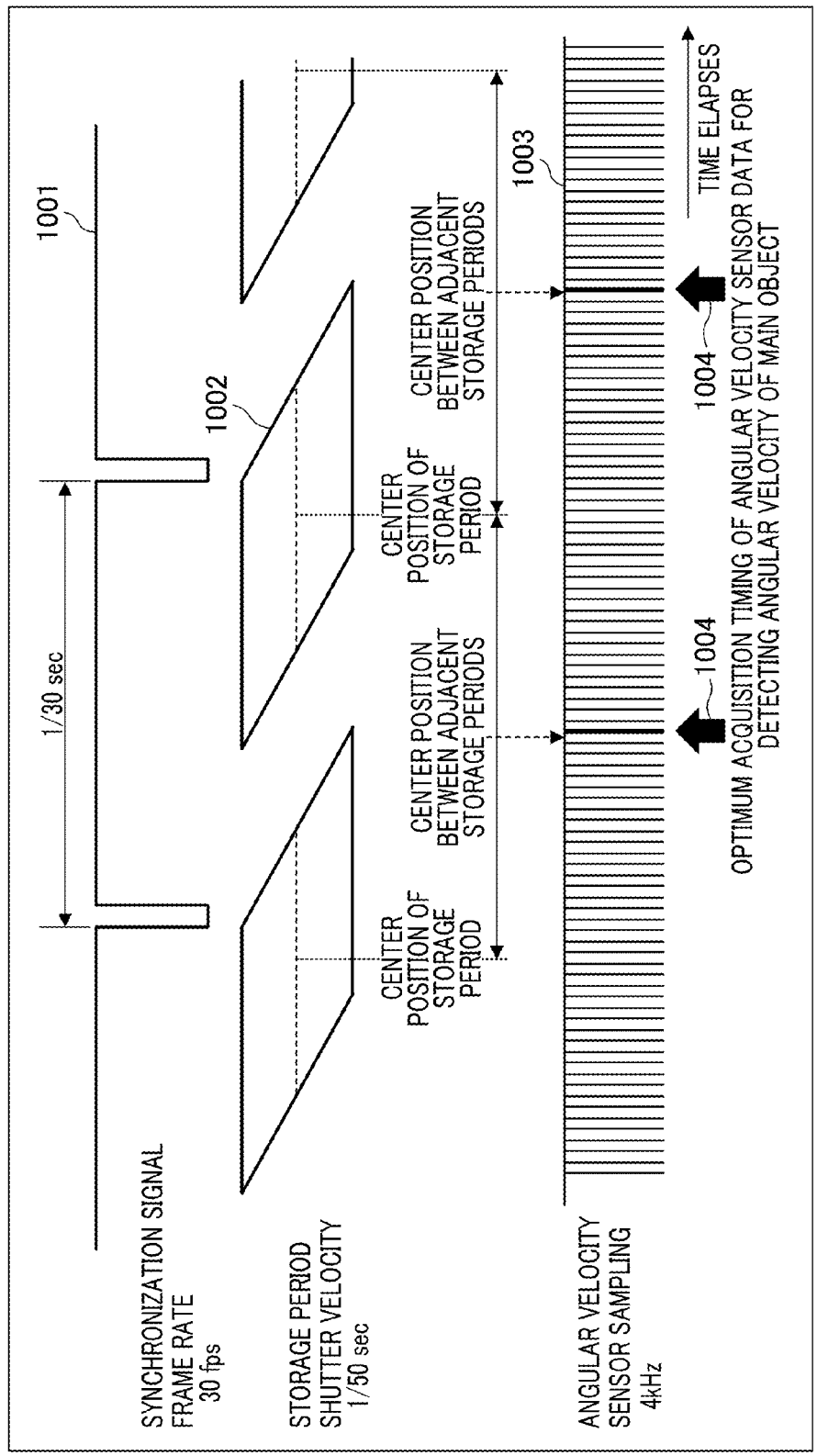
FIG. 10 is an explanatory view illustrating a sampling timing of angular velocity data.

Next, an amount-of-movement detection timing on an image surface and an angular velocity sensor detection timing according to the present embodiment will be described with reference to FIG. 10. FIG. 10 illustrates a synchronization signal 1001, a storage time 1002, and a sampling cycle 1003 of an angular velocity sensor output. In the example of FIG. 10, a frame rate of motion vector detection at a current camera angular velocity is set to be 30 fps, and a shutter velocity is set to be ⅟₅₀ sec. A cycle of the synchronization signal 1001 corresponds to a reciprocal of the frame rate. The storage time 1002 represents a storage time for each frame rate if a CMOS sensor is used as an imaging element. Moreover, the sampling cycle 1003 represents a sampling cycle in the A/D converter 401 for an output signal of the angular velocity sensor 111. As shown by arrow 1004, an acquisition timing of the angular velocity data for determining an angular velocity of the main object is a center position (center position) between a center position of the storage period and a center position of a next storage period.

According to the present embodiment, it is still possible to determine a movement vector of the main object by changing a frame rate at a time of detecting a motion vector according to an acquisition result of the camera angular velocity data even if there is a difference between a panning velocity of the camera and a moving velocity of an object. A detection frequency of the motion vector is variably controlled by changing the frame rate of the motion vector detection according to the angular velocity of the shake of the camera. Therefore, detection performance of an amount of movement of an object is improved, thereby increasing a probability of successful panning.

Second Embodiment

Hereinafter, with reference to FIGS. 14, 15A, and 15B, a second embodiment of the present invention will be described. In the present embodiment, in addition to change processing of a frame rate, resizing processing of an image used in the motion vector detection will be described. In the present embodiment, the same components as in the first embodiment will be given the same reference numerals as in the first embodiment, description of the components will be omitted, and differences will be mainly described. Such omission of description also applies to later embodiments.

Figure 14:
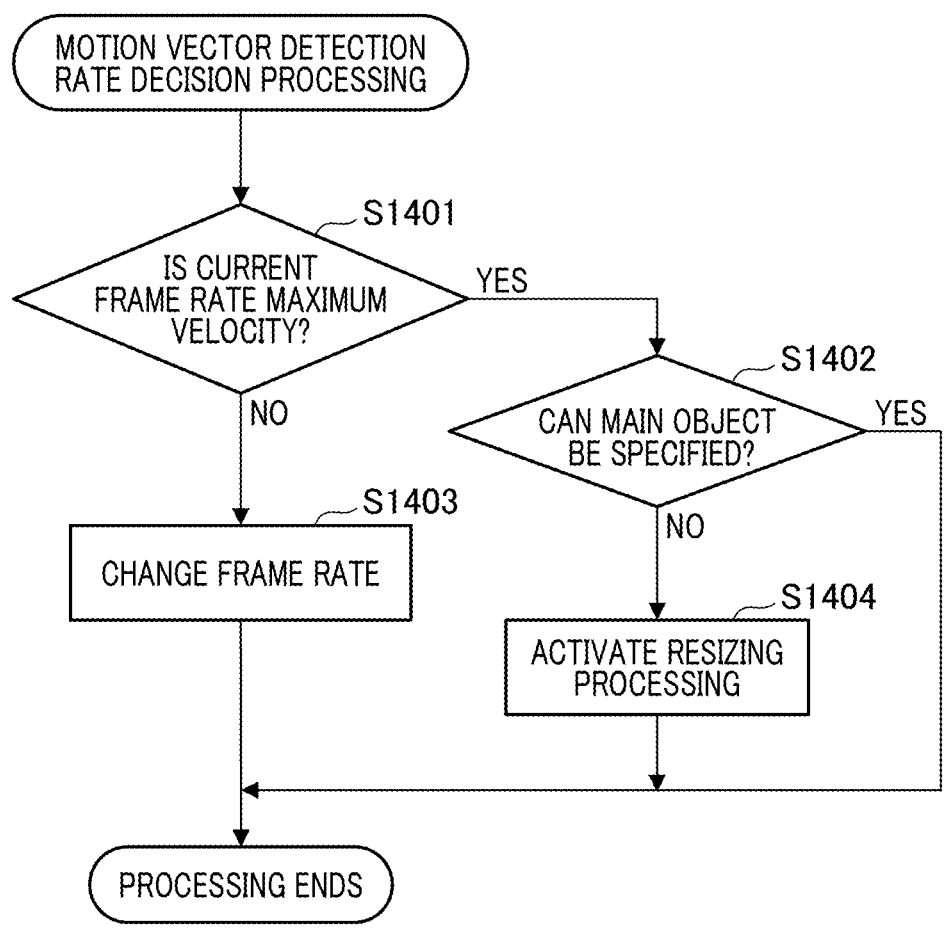
FIG. 14 is a flowchart illustrating decision processing of a frame rate of motion vector detection in a second embodiment of the present invention.

FIG. 14 is a flowchart which describes decision processing of a frame rate of motion vector detection in the present embodiment, and is a diagram illustrating a processing example of S507 in FIG. 5. First, in S1401, it is determined whether a frame rate of the motion vector detection unit 141 is a frame rate corresponding to a predetermined threshold value (for example, a maximum value). If a current frame rate is a value corresponding to a threshold value or more, that is, the maximum value, the processing proceeds to S1402, and otherwise, the processing proceeds to S1403.

Figure 13C:
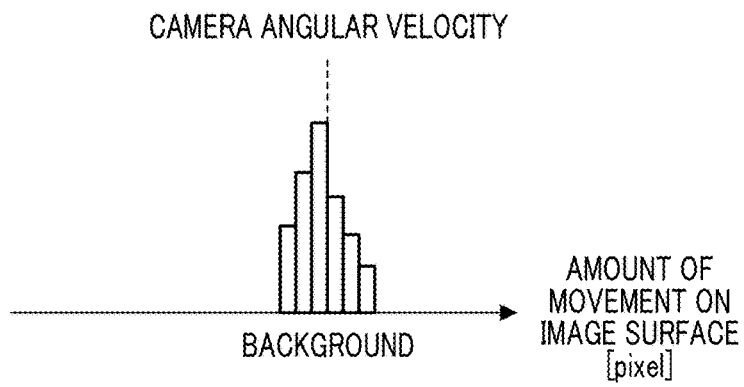

In S1402, it is determined whether the angular velocity of the main object in S506 of FIG. 5 is calculated. In this determination processing, using a histogram representing a frequency distribution of an amount of movement on an image surface as shown in FIGS. 13A to 13C, it is determined whether there is a frequency peak of the amount of movement on the image surface, which corresponds to the angular velocity of the main object in a place other than the vicinity of the camera angular velocity. If there is such a frequency peak, that is, if the main object can be specified, the processing ends there, and if the main object cannot be specified (refer to FIG. 13C), the processing proceeds to S1404.

In S1404, settings to activate the resizing processing are performed. Accordingly, before the motion vector detection unit 141 in the camera signal processing circuit 124 detects a motion vector from video information acquired from the imaging element 122 at a constant frame rate, reduction processing on the video information is executed. The resizing unit 142 performs the reduction processing using a bicubic method or the like based on a predetermined reduction rate. The resizing processing with normal settings is inactivated, but starts to be activated by executing setting processing of S1404. In S1403, since a frame rate is not a maximum value, the change processing of the frame rate is executed according to the characteristics described in FIG. 6A. The processing ends after S1403 or S1404.

Figure 15A:
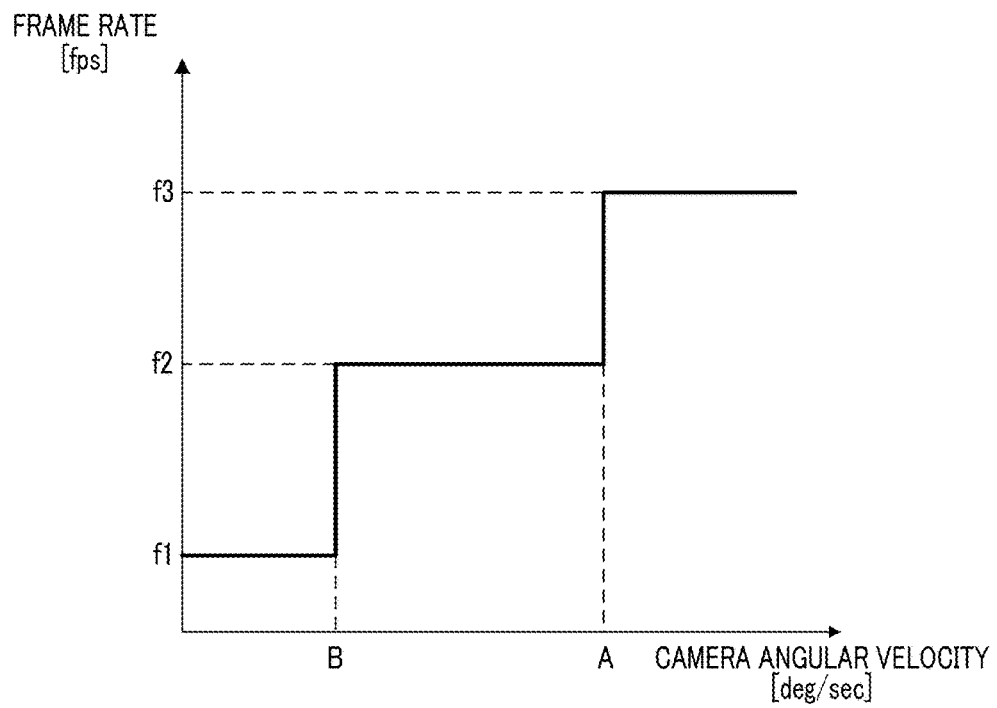
FIGS. 15A and 15B are graphs illustrating the characteristics of the frame rate in the second embodiment.
Figure 15B:
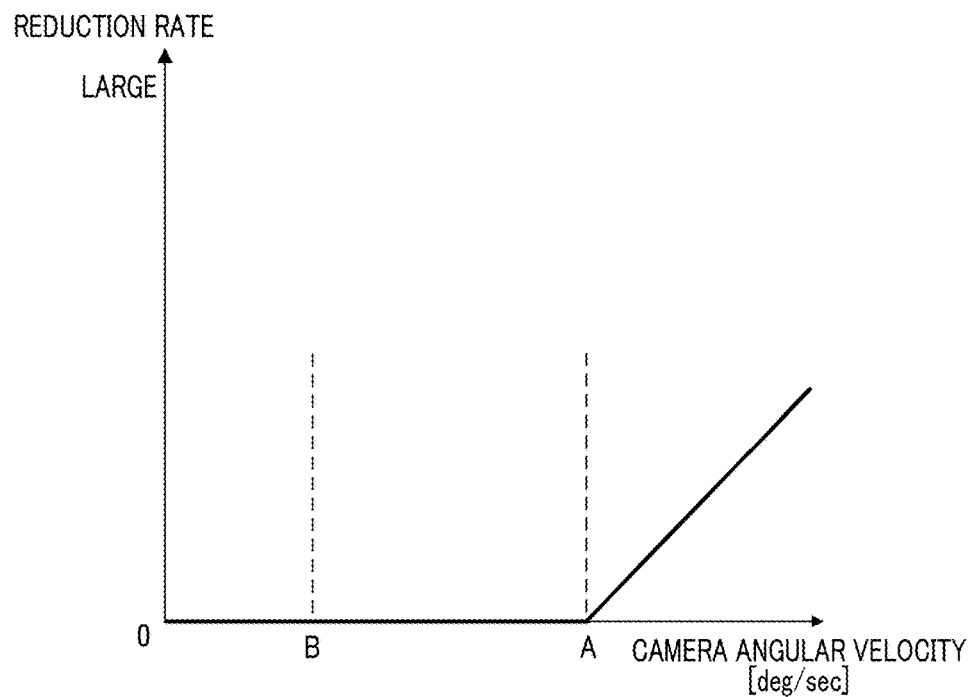

With reference to FIGS. 15A and 15B, a control example in the present embodiment will be described in detail. FIG. 15A illustrates characteristics of a frame rate for the camera angular velocity and is the same as in FIG. 6A. In addition, FIG. 15B is a graph representing characteristics at a time of changing a reduction rate by the resizing unit 142. A horizontal axis represents the camera angular velocity (unit: degrees/sec), and a vertical axis represents the reduction rate.

FIG. 15A shows an example in which the frame rate is changed from f2 to f3 at a point at which the camera angular velocity is a threshold value A, and thereafter, the frame rate is constantly f3 regardless of an increase of the camera angular velocity. In FIG. 15B, if the camera angular velocity is less than the threshold value A, the reduction rate is zero. If the camera angular velocity is the threshold value A or more, the reduction rate is increased linearly (refer to a straight line rising to the right).

As described above, the motion vector of the main object is adjusted to fall in the search range by a change in the frame rate up to a value of the camera angular velocity (threshold value A in FIGS. 15A and 15B). Then, if the camera angular velocity is the threshold value or more, images used in the motion vector detection are reduced. Accordingly, it is possible to improve detection performance of the amount of movement of the main object by widening a substantial search range and increasing a detection rate of the motion vector.

Characteristics shown in FIGS. 15A and 15B are an example. A combination of the frame rate and the reduction rate may include a characteristic that the reduction rate is increased with an increase in the camera angular velocity in a period with no change in the frame rate. For example, in FIG. 15B, the combination may include characteristics that the frame rate is a constant value f2 in a section from A to B of the camera angular velocity, and the reduction rate is increased with an increase in the camera angular velocity to A from B.

Moreover, in the present embodiment, a case in which the resizing unit 142 performs reduction processing on image information acquired by the imaging element 122 is described, but image data may be read in a state in which it is reduced by the imaging element 122. In this case, a reduction rate of FIG. 15B represents a reduction rate of an image read by the imaging element 122 instead of the resizing unit 142.

According to the present embodiment, in accordance with a result of the camera angular velocity data, the frame rate at a time of detecting a motion vector is changed and reduction processing of an image used to detect the motion vector is executed. Therefore, even if there is a discrepancy in a panning velocity of a camera and a moving velocity of a main object, it is possible to increase a motion vector detection rate of the main object and to further increase a probability of successful panning.

Third Embodiment

A third embodiment of the present invention will be described with reference to FIG. 16. In the present embodiment, control for a constant frame rate of display updating by changing a frame rate of motion vector detection will be described.

FIG. 16 is a flowchart which shows decision processing of a frame rate at the time of motion vector detection in a third embodiment of the present invention, and is a diagram illustrating a processing example of S507 in FIG. 5. First, a frame rate of the motion vector detection corresponding to a camera angular velocity is acquired in S1601. The frame rate change unit 143 changes the frame rate in characteristics shown in FIG. 17B. FIG. 17B is the same as FIG. 6A.

Figure 17A:
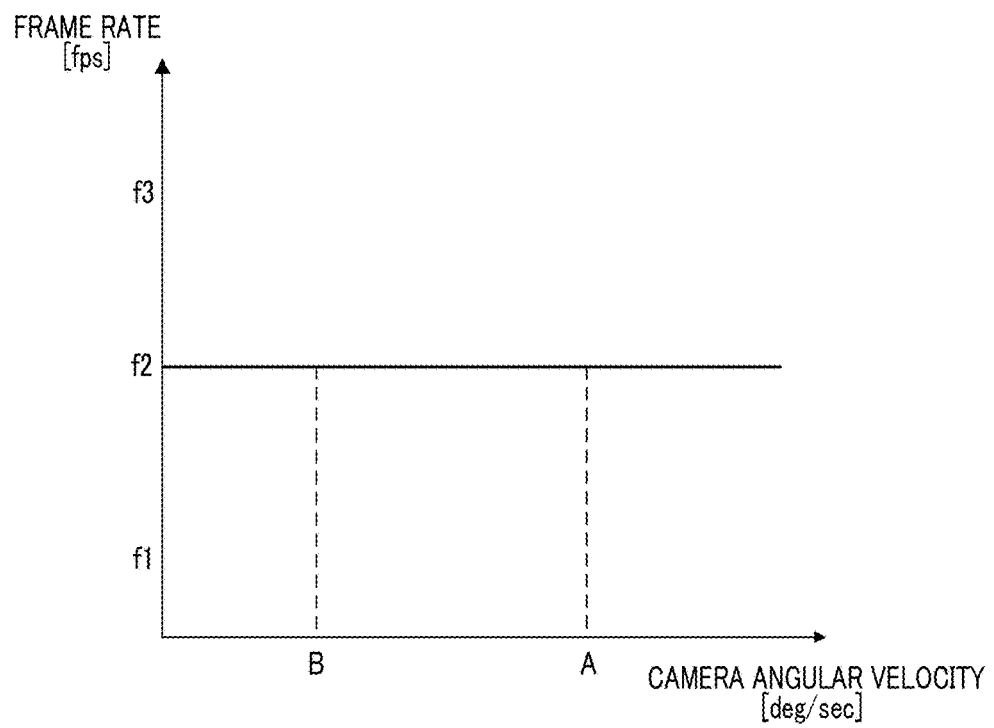
FIGS. 17A and 17B are graphs illustrating the characteristics of the frame rate in the third embodiment.
Figure 17B:
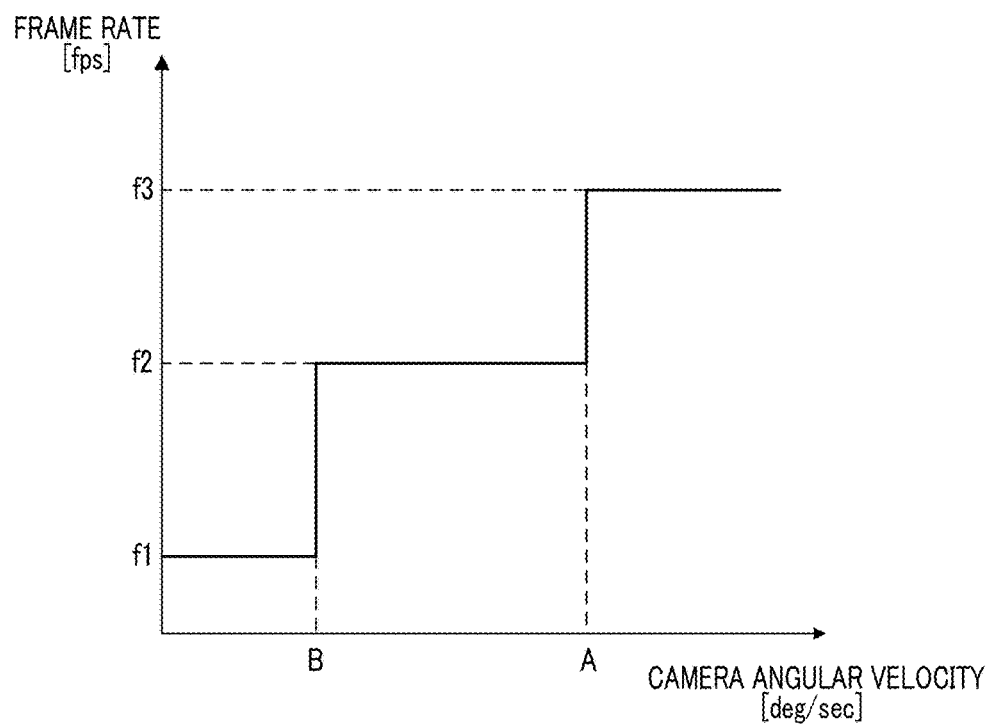

FIG. 17A illustrates a case in which display updating is performed in characteristics in which a frame rate does not depend on the camera angular velocity. In an example shown in FIG. 17A, a display updating frame rate is f2. A motion vector detection frame rate at a time when the camera angular velocity is A is f3 in FIG. 17B.

Next, the camera signal processing circuit 124 compares a motion vector detection frame rate obtained in S1601 with a display updating frame rate in S1602. If a value of the motion vector detection frame rate is a value of the display updating frame rate or more, the processing proceeds to S1603, and if the value of the motion vector detection frame rate is less than the value of the display updating frame rate, the processing proceeds to S1604.

In S1603, a frame rate (an imaging frame rate) at which image data is read from the imaging element 122 is set to the motion vector detection frame rate. This setting processing is performed with respect to TG125 from the frame rate change unit 143, and a read frame rate of the imaging element 122 is controlled. In the next S1605, an update interval for a synchronization signal is set in the display updating unit 144. That is, a display updating frame rate is set according to the characteristics of FIG. 17A. In the case of the example of FIGS. 17A and 17B, when the camera angular velocity is A, the motion vector detection frame rate is f3, and the display updating frame rate is f2. Accordingly, a frame rate at which image data is read from the imaging element 122 is f3 in S603 of FIG. 16. At this time, since a synchronization signal is generated at intervals corresponding to the frame rate f3 to set the display updating frame rate to f2, the display updating unit 144 updates a displayed image at a rate of once to twice with respect to the synchronization signal. Then, a series of processing ends. In S1604, the processing ends after a frame rate of the motion vector detection acquired in S1601 is set.

As the imaging element 122 according to a modified example of the present embodiment, a device capable of so-called multi-stream output, in which read timings are changed independently in line units and images of different frame rates are output in parallel, can be used. In this case, the imaging element 122 includes a plurality of photoelectric conversion elements disposed in a matrix shape, and outputs an image signal of a first frame rate and an image signal of a second frame rate by varying a read timing for each of a predetermined number of lines in a predetermined direction. TG125 controls the imaging element 122 according to a signal from the camera signal processing circuit 124, and thereby each of the image signals of the first and the second frame rates is read. The frame rate change unit 143 decides a value of the first frame rate corresponding to the angular velocity of the shake of the camera, and the display updating unit 144 sets the second frame rate to be a constant value. That is, video information displayed on a screen of the display unit 172 is acquired from the imaging element 122 at the second frame rate according to characteristics of the display updating frame rate illustrated in FIG. 17A. Independently from the above, video information for the motion vector detection is acquired from the imaging element 122 at the first frame rate according to characteristics of the frame rate illustrated in FIG. 17B. In the case of operations at two independent frame rates, TG125 controls a frame rate at which each piece of video information is acquired according to an instruction of the frame rate change unit 143. A display updating interval in the display updating unit 144 is set at a ratio of 1/1 with respect to a synchronization signal.

According to the present embodiment, it is possible to increase probability of successful panning by changing a frame rate at a time of detecting a motion vector in accordance with a result of the camera angular velocity data. In addition, since control for a constant frame rate of a display updating is performed, a frequency of the display updating is not changed due to a change in a frame rate according to the motion vector detection.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145450, filed Jul. 23, 2015 which is hereby incorporated by reference wherein in its entirety.

What is claimed is:

1. An image processing apparatus comprising:
   at least one processor or circuit configured to perform the operations of the following units:
   an acquisition unit configured to acquire an angular velocity of panning of an imaging device detected by an angular velocity sensor and a motion vector of an object detected from a plurality of image data successively imaged by an imaging element;
   a decision unit configured to decide a value of a frame rate when the image data is acquired from the imaging element used to detect the motion vector; and
   a calculation unit configured to calculate an angular velocity of the object with respect to the imaging device from the angular velocity of the panning and the motion vector of the object,
   wherein the decision unit decides the value of the frame rate corresponding to the angular velocity of the panning and the acquisition unit acquires the motion vector of the object detected from the plurality of the image data imaged at the frame rate decided by the decision unit.

2. An image processing apparatus comprising:
   at least one processor or circuit configured to perform the operations of the following units:
   an acquisition unit configured to acquire an angular velocity of panning of an imaging device detected by an angular velocity sensor and a motion vector of an object detected from a plurality of image data successively imaged by an imaging element;

a decision unit configured to decide a value of a frame rate when the image data is acquired from the imaging element used to detect the motion vector; and a calculation unit configured to calculate an angular velocity of the object with respect to the imaging device from the angular velocity of the panning and the motion vector of the object, wherein, if the angular velocity of the panning is large, the decision unit changes the frame rate to a larger value than a case in which the angular velocity of the panning is small.

3. An image processing apparatus comprising:

at least one processor or circuit configured to perform the operations of the following units:

an acquisition unit configured to acquire an angular velocity of panning of an imaging device detected by an angular velocity sensor and a motion vector of an object detected from a plurality of image data successively imaged by an imaging element;

a decision unit configured to decide a value of a frame rate when the image data is acquired from the imaging element used to detect the motion vector; and a calculation unit configured to calculate an angular velocity of the object with respect to the imaging device from the angular velocity of the panning and the motion vector of the object, wherein, if a focal length of an imaging optical system is large, the decision unit changes the frame rate to a larger value than a case in which the focal length of the imaging optical system is small.

4. An imaging device comprising:

the image processing apparatus according to claim 1;

an image shake correction unit configured to correct an image shake of an image acquired by the imaging element; and a control unit configured to acquire information of the angular velocity of the object calculated by the calculation unit and to control to reduce a difference between the angular velocity of the object and the angular velocity of panning using the image shake correction unit.

5. The imaging device according to claim 4, further comprising:

a first detection unit configured to detect the angular velocity of the panning; and a second detection unit configured to detect the motion vector of the object from a plurality of image data successively imaged by the imaging element, wherein the control unit performs to control an image shake correction using the image shake correction unit in a first mode, acquires the information of the angular velocity of the object calculated by the calculation unit from the information detected by the first and second detection units in a second mode, and perform control to reduce the difference between the angular velocity of the object and the angular velocity of the panning using the image shake correction unit.

6. The imaging device according to claim 5, further comprising:

a reduction unit configured to perform a reduce processing for reducing the image imaged by the imaging element, wherein the second detection unit detects the motion vector of the object using a plurality of image data which are successively imaged by the imaging element and are performed the reduce processing by the reduction unit.

7. The imaging device according to claim 6, wherein, if the frame rate corresponding to the angular velocity of the panning is smaller than a threshold value, the decision unit changes the frame rate, and if the frame rate is equal to or more than the threshold value and the angular velocity of the object is not calculated by the calculation unit, the reduction unit performs the reduce processing of the image imaged by the imaging element.

8. The imaging device according to claim 6, wherein, if the angular velocity of the panning is large, the reduction unit sets reduction rate of the image larger than the case in which the angular velocity of the panning is small.

9. The imaging device according to claim 8, wherein, if the angular velocity of the panning is larger than the threshold value, the reduction unit increases the reduction rate of the image in accordance with an increase of the angular velocity of the panning.

10. The imaging device according to claim 4, further comprising:

a display unit configured to display the image acquired by the imaging element; and a display updating unit configured to update the image displayed by the display unit, wherein the display updating unit performs the display updating of the image at the frame rate of a constant value without depending on the frame rate changed by the decision unit.

11. The imaging device according to claim 10, further comprising:

a reading unit configured to output an image signal of a first frame rate and an image signal of a second frame rate by varying a readout timing in a line unit in the imaging element including a plurality of photoelectric conversion elements, wherein the decision unit decides the value of the first frame rate corresponding to the angular velocity of the panning, and wherein the display updating unit sets the second frame rate to be the constant value.

12. A control method of an image processing apparatus, the method comprising:

deciding a value of a frame rate when an image data is acquired from an imaging sensor used to detect motion vector of an object from an angular velocity of panning of an imaging device detected by an angular velocity sensor;

acquiring the angular velocity of the panning and the motion vector of the object detected from a plurality of image data successively imaged by the imaging element at the frame rate; and calculating the angular velocity of the object with respect to the imaging device from the angular velocity of the panning and the motion vector of the object.

13. A control method of an imaging device which controls an image shake correction unit and corrects an image shake of an image acquired by an imaging element, the method comprising:

deciding a value of a frame rate when an image data is acquired from an imaging sensor used to detect motion vector of an object from an angular velocity of panning of the imaging device detected by an angular velocity sensor;

acquiring the angular velocity of the panning of the imaging device and motion vector of the object detected from a plurality of image data successively imaged by the imaging element at the frame rate;

calculating the angular velocity of the object with respect to the imaging device from the angular velocity of the panning and the motion vector of the object; and controlling to acquire information of the calculated angular velocity and to reduce a difference between the angular velocity of the object and the angular velocity of the panning using the image shake correction unit.

* * * * *